(12) United States Patent
Al-Ahmed et al.

(10) Patent No.: US 10,046,985 B2
(45) Date of Patent: Aug. 14, 2018

(54) METHOD FOR REMOVING CATIONIC DYES FROM AN AQUEOUS SOLUTION USING AN ADSORBENT

(71) Applicant: KING FAHD UNIVERSITY OF PETROLEUM AND MINERALS, Dhahran (SA)

(72) Inventors: Amir Al-Ahmed, Dhahran (SA); Arun M. Isloor, Surathkal (IN)

(73) Assignee: King Fahd University of Petroleum and Minerals, Dhahran (SA)

( * ) Notice: Subject to any disclaimer, the term of this patent is extended or adjusted under 35 U.S.C. 154(b) by 150 days.

(21) Appl. No.: 15/041,540

(22) Filed: Feb. 11, 2016

(65) Prior Publication Data

US 2017/0233265 A1 Aug. 17, 2017

(51) Int. Cl.
| | | |
|---|---|---|
| *B01D 15/04* | (2006.01) | |
| *C02F 1/28* | (2006.01) | |
| *B01J 20/26* | (2006.01) | |
| *B01J 20/28* | (2006.01) | |
| *B01J 20/34* | (2006.01) | |
| *B01J 20/20* | (2006.01) | |
| *B01J 49/00* | (2017.01) | |
| *C02F 1/42* | (2006.01) | |
| *C02F 101/30* | (2006.01) | |

(52) U.S. Cl.
CPC ............ *C02F 1/286* (2013.01); *B01J 20/20* (2013.01); *B01J 20/267* (2013.01); *B01J 20/28038* (2013.01); *B01J 20/3475* (2013.01); *C02F 1/283* (2013.01); *C02F 2101/308* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 3,091,550 A | 5/1963 | Doying | |
| 6,143,692 A | 11/2000 | Sanjay et al. | |
| 6,258,276 B1 * | 7/2001 | Mika ............... | B01D 61/027 210/638 |

(Continued)

FOREIGN PATENT DOCUMENTS

| | | |
|---|---|---|
| CN | 103752281 A | 4/2014 |
| CN | 103043916 B | 6/2015 |

OTHER PUBLICATIONS

Shenvi et al. (Humic Acid Based Biopolymeric Membrane for Effective Removal of Methylene Blue and Rhodamine B, Ind. Eng. Chem. Res. (Apr. 23, 2015), 54, pp. 4965-4975).*

(Continued)

*Primary Examiner* — Hayden Brewster
(74) *Attorney, Agent, or Firm* — Oblon, McClelland, Maier & Neustadt, L.L.P.

(57) ABSTRACT

A method of removing at least one cationic dye from an aqueous solution. The method includes contacting the aqueous solution with an adsorbent comprising a water-insoluble membrane disposed on a substrate. The water-insoluble membrane comprises cross-linked humic acid, at least one alginate, and hydroxyethyl cellulose. The contacting forms a treated aqueous solution having a lower concentration of the at least one cationic dye relative to the aqueous solution.

21 Claims, 32 Drawing Sheets

(56) References Cited

U.S. PATENT DOCUMENTS

| | | | | |
|---|---|---|---|---|
| 2005/0263456 | A1* | 12/2005 | Cooper | A61L 2/0082 210/660 |
| 2012/0308650 | A1 | 12/2012 | Vegas et al. | |
| 2014/0135212 | A1* | 5/2014 | Edmiston | B01J 20/265 502/402 |
| 2016/0355409 | A1* | 12/2016 | Gondal | C02F 1/32 |

OTHER PUBLICATIONS

Yan et al. (Sorption of methylene blue by carboxymethyl cellulose, Colliods and Surfaces, 380 (2011), pp. 143-151).*

Duan Yi, "Sodium alginate porous film on the water U (VI), Cu (II) adsorption behavior and mechanism of", http://www.dissertationtopic.net/doc/2124720, 2013, 2 pages (Abstract only).

Boris Polyak, et al., "Synthesis and Characterization of a Biotin-Alginate Conjugate and Its Application in a Biosensor Construction", Biomacromolecules, vol. 5, No. 2, Mar.-Apr. 2004, pp. 389-396 (Abstract only).

Zuo Q, et al., "Heparin-conjugated alginate multilayered microspheres for controlled release of bFGF", Biomed Mater., vol. 10, No. 3, Jun. 4, 2015, 2 pages (Abstract only).

Cuccuru Ma, et al., "A simple, rapid and inexpensive technique to bind small peptides to polystyrene surfaces for immunoenzymatic assays", J Immunol Methods, vol. 382, No. 1-2, Aug. 31, 2012, pp. 216-219 (Abstract only).

Yamada Y, et al., "Biological activity of laminin peptide-conjugated alginate and chitosan matrices", Biopolymers, vol. 94, No. 6, 2010, pp. 711-720 (Abstract only).

Liang Peng, et al., "Modifying $Fe_3O_4$ nanoparticles with humic acid for removal of Rhodamine B in water", Journal of Hazardous Materials, vol. 209-210, 2012, pp. 193-198.

A. Gürses, et al., The adsorption kinetics of the cationic dye, methylene blue, onto clay, Journal of Hazardous Materials B, vol. 131, 2006, pp. 217-228.

Jian Hua Chen, et al., "Adsorption mechanism of Cu(II) ions from aqueous solution by glutaraldehyde crosslinked humic acid-immobilized sodium alginate porous membrane adsorbent", Chemical Engineering Journal, vol. 173, 2011, pp. 511-519.

Jian Hua Chen, et al., "Adsorption behavior of Cd(II) ions on humic acid-immobilized sodium alginate and hydroxyl ethyl cellulose blending porous composite membrane adsorbent", Desalination, vol. 285, 2012, pp. 54-61.

* cited by examiner

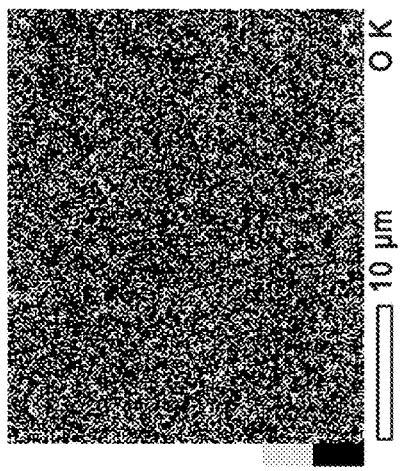
FIG. 7A  FIG. 7B
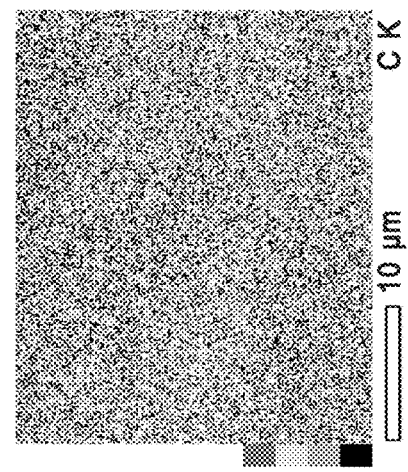
FIG. 7C
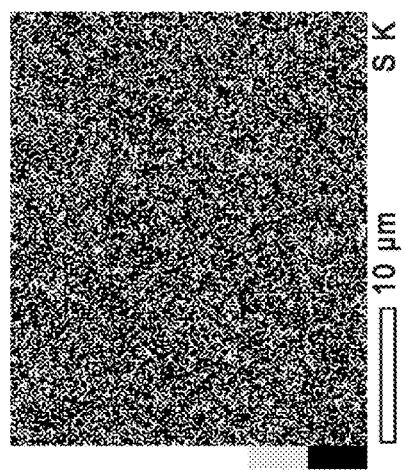
FIG. 7D
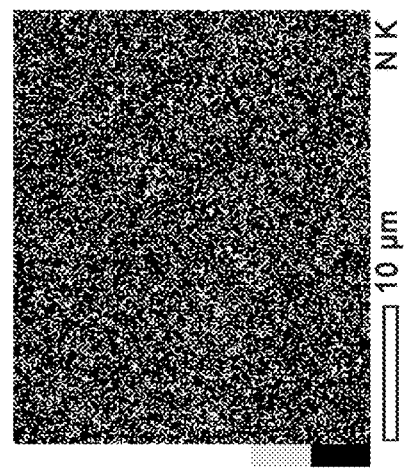

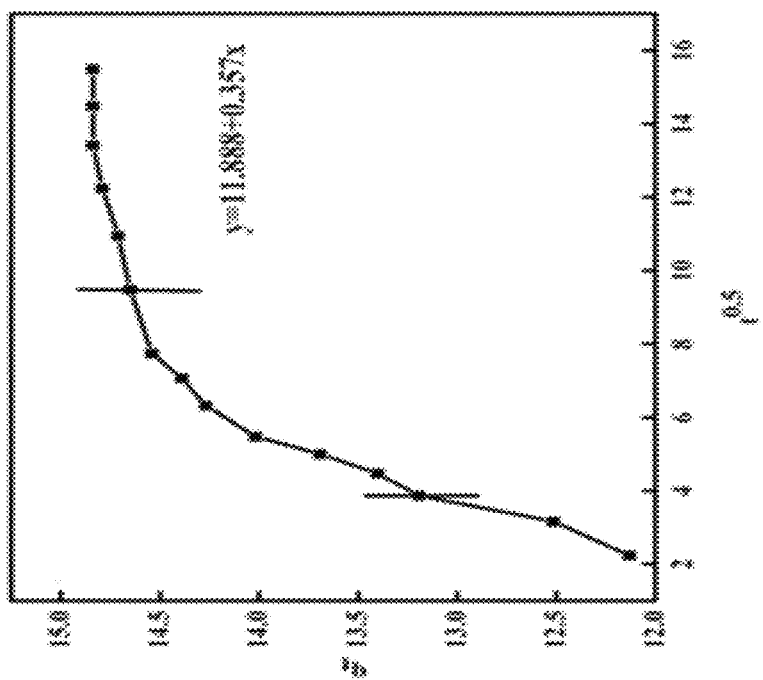

METHOD FOR REMOVING CATIONIC DYES FROM AN AQUEOUS SOLUTION USING AN ADSORBENT

BACKGROUND OF THE INVENTION

Technical Field

The present disclosure relates to the field of methods for removing cationic dyes from an aqueous solution. More specifically, the present disclosure relates to a method of removing one or more cationic dyes from an aqueous solution using an adsorbent comprising a water-insoluble membrane comprising cross-linked humic acid, at least one alginate, and hydroxyethyl cellulose disposed on a substrate.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

Dyes are commonly used in textile, pharmaceutical, food, tanning and paper industries (See M. N. Ashiq, M. Najam-Ul-Haq, T. Amanat, A. Saba, A. M. Qureshi, M. Nadeem, Removal of methylene blue from aqueous solution using acid/base treated rice husk as an adsorbent, Desalination and Water Treatment, 49 (2012) 376-383. M. T. Yagub, T. K. Sen, S. Afroze, H. M. Ang, Dye and its removal from aqueous solution by adsorption: a review, Adv. Colloid Interface Sci., 209 (2014) 172-184. J. R. Deka, C. L. Liu, T. H. Wang, W. C. Chang, H. M. Kao, Synthesis of highly phosphonic acid functionalized benzene-bridged periodic mesoporous organosilicas for use as efficient dye adsorbents, J. Hazard. Mater., 278 (2014) 539-550, each incorporated herein by reference in their entirety). Types of dyes include basic and or cationic dyes which are positively charged stains that react with a material that is negatively charged. Cationic dyes typically contain amino groups, or alkylamino groups, as their auxochromes. Examples of cationic dyes are methylene blue, rhodamine B, crystal violet, basic fuchsin, safranin, pararosaniline, etc.

Waste water containing dyes has resulted in pollution of many water sources, including ground water and river water from which tap water and drinking water are obtained. Dyes affect the chemical oxygen demand (COD) and sunlight penetration in water, both of which have a detrimental effect on aquatic life (See K. Zhou, Q. Zhang, B. Wang, J. Liu, P. Wen, Z. Gui, Y. Hu, The integrated utilization of typical clays in removal of organic dyes and polymer nanocomposites, Journal of Cleaner Production, 81 (2014) 281-289, incorporated herein by reference in its entirety). Cationic dyes have such a high color intensity that even at trace levels, they impart color to water, making it undesirable for consumption. Although cationic dyes such as methylene blue (MB) and rhodamine B (RhB) are not as hazardous as azo or reactive dyes, acute exposure to them may result in serious health issues. Inhalation of MB can cause increased heart rate, and ingestion of MB may lead to vomiting, nausea, jaundice, tissue necrosis and quadriplegia (See A. Gürses, A. Hassani, M. Kiranşan, Ö. Açişli, S. Karaca, Removal of methylene blue from aqueous solution using by untreated lignite as potential low-cost adsorbent: Kinetic, thermodynamic and equilibrium approach, Journal of Water Process Engineering, 2 (2014) 10-21, incorporated herein by reference in its entirety). RhB is a common staining dye in biotechnology known to have neurotoxicity and carcinogenicity, and can cause irritation of the skin, eyes and respiratory tract (See H. Mittal, S. B. Mishra, Gum ghatti and $Fe_3O_4$ magnetic nanoparticles based nanocomposites for the effective adsorption of rhodamine B, Carbohydr. Polym., 101 (2014) 1255-1264. K. G. Bhattacharyya, S. SenGupta, G. K. Sarma, Interactions of the dye, Rhodamine B with kaolinite and montmorillonite in water, Appl. Clay Sci., 99 (2014) 7-17, each incorporated herein by reference in their entirety).

Because dyes are toxic and non-biodegradable, removal of dyes from water sources is necessary to provide clean and safe water and protect aquatic life (See N. Jain, A. Bhargava, J. Panwar, Enhanced photocatalytic degradation of methylene blue using biologically synthesized "protein-capped" ZnO nanoparticles, Chem. Eng. J. (Lausanne), 243 (2014) 549-555. Y. Li, Q. Du, T. Liu, J. Sun, Y. Wang, S. Wu, Z. Wang, Y. Xia, L. Xia, Methylene blue adsorption on graphene oxide/calcium alginate composites, Carbohydr. Polym., 95 (2013) 501-507, each incorporated herein by reference in their entirety).

It is an object of this disclosure to provide methods for removing cationic dyes from water or an aqueous solution using an adsorbent comprising a water-insoluble membrane comprising cross-linked humic acid, at least one alginate, and hydroxyethyl cellulose disposed on a substrate.

BRIEF SUMMARY OF THE INVENTION

The present disclosure relates to a method of removing at least one cationic dye from an aqueous solution. The method includes contacting the aqueous solution with an adsorbent comprising a water-insoluble membrane disposed on a substrate. The water-insoluble membrane comprises cross-linked humic acid, at least one alginate, and hydroxyethyl cellulose. The contacting forms a treated aqueous solution having a lower concentration of the at least one cationic dye relative to the aqueous solution.

In one or more embodiments, the weight ratio of humic acid:at least one alginate:hydroxyethyl cellulose lies in the range 5-30:40-90:5-30.

In one or more embodiments, the at least one alginate comprises an unmodified alginate, a modified alginate, or a combination thereof.

In one or more embodiments, the humic acid, the at least one alginate, and the hydroxyethyl cellulose are cross-linked by at least one cross-linking agent selected from the group consisting of aldehydes, oxidoreductase enzymes, and a combination thereof.

In one or more embodiments, at least one of the cross-linked humic acid, at least one alginate, and hydroxyethyl cellulose comprises or is modified to comprise a first molecular moiety, and the substrate comprises or is modified to comprise a second molecular moiety, and the disposition of the water-insoluble membrane on the substrate comprises binding of the first molecular moiety to the second molecular moiety.

In one or more embodiments, the pH of the aqueous solution ranges from about 3 to about 10.

In one or more embodiments, the substrate comprises at least one selected from the group consisting of polypropylene, polystyrene, PET (polyethylene terephtalate), polyimide, PEN (polyethylene naphthalate), agarose, acetate cellulose, PC (polycarbonate), glass, plastic, rubber, a metal, an alloy, a ceramic, a carbonaceous material, a polymer, sand, silicon, and silica.

In one or more embodiments, the at least one cationic dye is selected from the group consisting of methylene blue, rhodamine B, crystal violet, basic fuchsin, safranin, pararosaniline, and a combination thereof.

In one or more embodiments, the at least one cationic dye is methylene blue, and the adsorbent removes at least 90% of the methylene blue from the aqueous solution.

In one or more embodiments, the at least one cationic dye is rhodamine B, and the adsorbent removes at least 90% of the rhodamine B from the aqueous solution.

In one or more embodiments, the at least one cationic dye is rhodamine B, and the concentration of the rhodamine B in the aqueous solution is adjusted to be below 75 mg/L.

In one or more embodiments, the method further comprises regenerating the adsorption ability of the adsorbent.

In one or more embodiments, the regenerating the adsorption ability of the adsorbent comprises treating the adsorbent with at least one mineral or strong acid and/or at least one organic acid for a period of time effective to desorb the at least one cationic dye from the adsorbent.

In one or more embodiments, the concentration of the water-insoluble membrane of the adsorbent contacting the aqueous solution ranges from 0.04 g/100 ml to 0.64 g/100 ml of the aqueous solution.

In one or more embodiments, the adsorbent is disposed in a fixed bed reactor or fluidized bed reactor and the contacting involves passing the aqueous solution through the fixed bed reactor or fluidized bed reactor.

In one or more embodiments, the fixed bed reactor comprises a cartridge.

In one or more embodiments, the cartridge further comprises activated carbon.

In one or more embodiments, the adsorbent has a form selected from the group consisting of a granule, a pellet, a sphere, a powder, a woven fabric, a non-woven fabric, a mat, a felt, a block, and a honeycomb.

In one or more embodiments, the aqueous solution is contacted with the adsorbent at a temperature of about 10-90° C. and a pressure of about 1-50 bar.

In one or more embodiments, the method further comprises removing the adsorbent from the treated aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 7A-7D are graphical presentation of the elemental mapping result of the adsorbent membrane adsorbed with MB according to Example 2.

FIG. 33 is a graphical presentation of the intraparticle diffusion modeling of MB adsorption by the adsorbent according to Example 8.

FIG. 34 is a graphical presentation of the intraparticle diffusion modeling of RhB adsorption by the adsorbent according to Example 8.

DETAILED DESCRIPTION OF THE EMBODIMENTS

Figure 1:
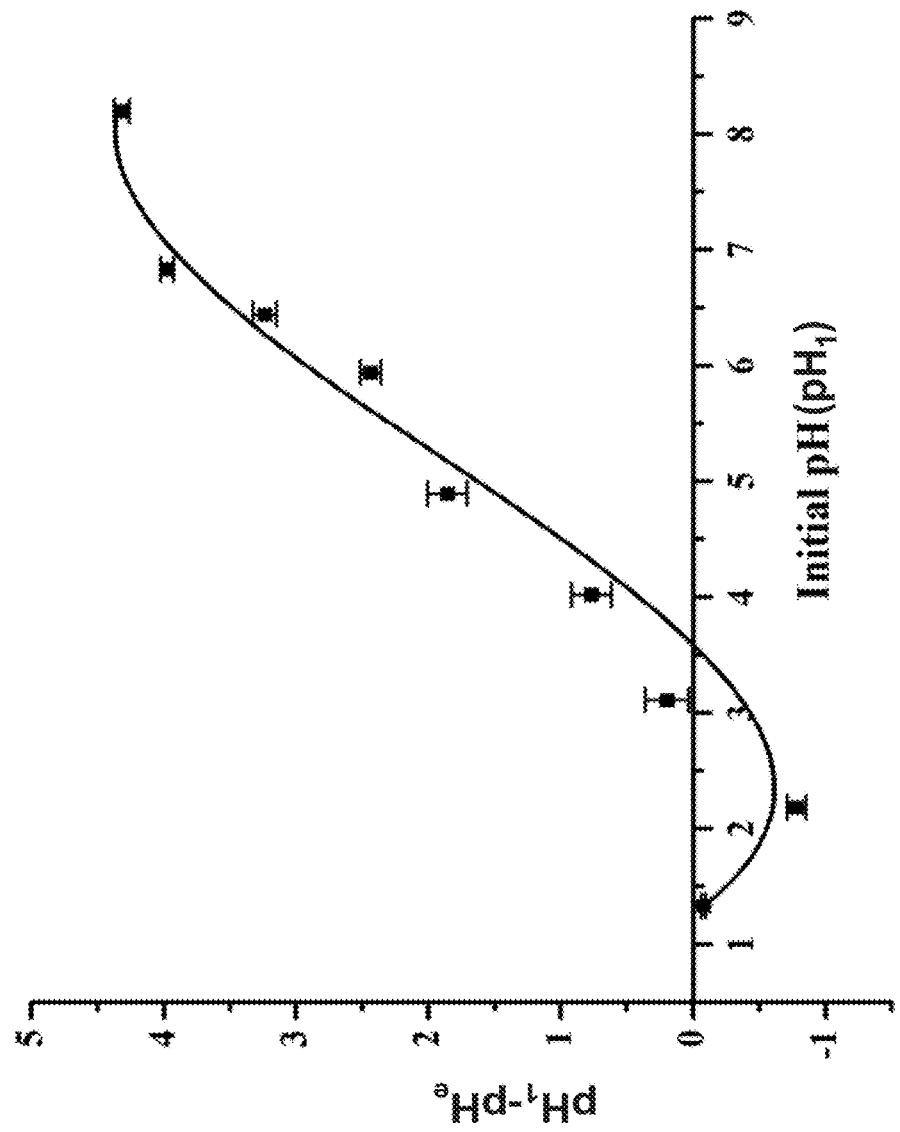
FIG. 1 is a graphical presentation showing the point of zero charge of the adsorbent membrane based on the graph of $\Delta pH$ ($pH_i - pH_e$) versus initial pH ($pH_i$) according to Example 2.

The present disclosure provides a method of removing at least one cationic dye from an aqueous solution. The method includes contacting the aqueous solution with an adsorbent comprising a water-insoluble membrane disposed on a substrate. The water-insoluble membrane comprises cross-linked humic acid, at least one alginate, and hydroxyethyl cellulose. The contacting forms a treated aqueous solution having a lower concentration of the at least one cationic dye relative to the aqueous solution.

In some embodiments, the aqueous solution comprises at least one selected from the group consisting of industrial waste water, tap water, ground water, river water, and runoff streams.

In some embodiments, the at least one cationic dye is selected from the group consisting of methylene blue, rhodamine B, crystal violet, basic fuchsin, safranin, pararosaniline, and a combination thereof.

Humic acid is a principal component of humic substances, which are the major organic constituents of soil (humus), peat, coal, many upland streams, dystrophic lakes, and ocean water. It is produced by biodegradation of dead organic matter. It is not a single acid; rather, it is a complex mixture of many different acids containing carboxyl and phenolate groups so that the mixture behaves functionally as a dibasic acid or, occasionally, as a tribasic acid. Humic acids can form complexes with ions that are commonly found in the environment creating humic colloids.

Humic acid is dark brown to black in color and is considered to be a complex aromatic macromolecule with various linkages between the aromatic groups, with a molecular weight of from about 800 daltons to about 500,000 daltons. The different compounds involved in linkages include amino acids, amino sugars, peptides, aliphatic acids and other aliphatic compounds. For example, a typical humic acid may have a variety of components including quinone, phenol, catechol and sugar moieties.

The carboxylic, phenolic, aliphatic and enolic-hydroxyl and carbonyl are the various functional groups in humic acids. The functional groups that contribute most to surface charge and reactivity of humic acids are phenolic and carboxylic groups. Humic acids behave as mixtures of dibasic acids, with a pK1 value around 4 for protonation of carboxyl groups and around 8 for protonation of phenolate groups. There is considerable overall similarity among individual humic acids. The other important characteristic is charge density. The humic acid molecules may form a supramolecular structure held together by non-covalent forces, such as Van der Waals force, π-π, and CH-π bonds. The presence of carboxylate and phenolate groups gives humic acids the ability to form complexes with ions such as $Mg^{2+}$, $Ca^{2+}$, $Fe^{2+}$ and $Fe^{3+}$. Many humic acids have two or more of these groups arranged so as to enable the formation of chelate complexes.

Humic acid is an association of molecules forming aggregates of elongated bundles of fibers at low pHs and open flexible structures perforated by voids at high pHs. The voids can trap and adsorb both organic and inorganic particles if the charges are complementary.

The sorption of chemicals onto the surfaces of humic substances has been studied by a large number of environmental chemists. Sorption mechanisms include Van der Waals attractions, hydrophobic bonding, hydrogen bonding, charge transfer, ion exchange, and ligand exchange.

In some embodiments, the humic acid used to form the water-insoluble membrane has a weight average molecular weight of 800-500,000 Da, preferably 1,000-450,000 Da, preferably 2,500-400,000 Da, preferably 5,000-350,000 Da, more preferably 7,500-300,000 Da, more preferably 10,000-250,000 Da, more preferably 25,000-200,000 Da, more preferably 50,000-150,000 Da, or more preferably 75,000-100,000 Da. In other embodiments, the humic acid used to form the water-insoluble membrane has a weight average molecular weight of at least 1,000 Da, at least 5,000 Da, at least 10,000 Da, at least 25,000 Da, at least 50,000 Da, preferably at least 100,000 Da, preferably at least 150,000 Da, more preferably at least 200,000 Da, more preferably at least 250,000 Da, more preferably at least 300,000 Da, or more preferably at least 400,000 Da.

Humic acid dissolves in water at elevated pH under certain conditions, such as in the presence of monovalent species (e.g. alkaline salts and the like). Humic acid cross-linked by a cross-linking agent has a low solubility in water at neutral or higher than neutral pH. Exemplary cross-linking agents include aldehydes and oxidoreductase enzymes, specifically, for example, glutaraldehyde or a mixture of glutaraldehyde and mineral acid (HCl, $HNO_3$, $H_2SO_4$, $H_3PO_4$, etc.).

Among the aldehydes that can be used for cross-linking humic acid are aliphatic or aromatic aldehydes having from 1 to 22 carbon atoms. The aldehydes may be substituted with any substituent that does not adversely affect the cross-linking capabilities of the aldehydes. The aldehydes may be saturated or unsaturated. The aldehyde may be an aromatic aldehyde, such as benzaldehyde, tolualdehyde (o-, m-, or p-) or salicylaldehyde.

Any type of oxidoreductase enzyme can be used to cross-link the humic acid, including peroxidases and hydrogenases.

The cross-linking is effected by reacting the humic acid with the aldehyde or oxidoreductase enzymes such as peroxidase enzymes at room temperature or slightly above room temperature for a period of two to five hours.

Refined from brown seaweeds, alginates are natural anionic polysaccharides made up by D-mannuronic and L-guluronic acid residues joined linearly by 1-4 glycosidic linkages. Alginates from different species of brown seaweed often have variations in their chemical structure, resulting in different physical properties. For example, some may yield an alginate that gives a strong gel, while others may yield a weaker gel. Alginates are commonly available as a sodium or potassium salt (i.e., sodium alginate or potassium alginate). Natural alginates may be chemically modified to obtain synthetic alginates with improved biocompatibility and more desirable physiochemical properties, such as alginate polymer stability, pore size, and hydrophobicity/hydrophilicity.

The viscosity of an alginate solution can vary, depending on the alginate concentration, length of the alginate molecules, or the number of monomer units in the chains, or the weight average molecular weight of an alginate polymer (the weight average molecular weight of sodium alginate typically ranges from 10,000 to 600,000 Da), with longer chains resulting in higher viscosities at similar concentrations. For example, a low viscosity sodium alginate available from Sigma Aldrich has a viscosity of 4-12 cP when dissolved in water at a concentration of 1% at 25° C. A medium viscosity sodium alginate available from Sigma Aldrich has a viscosity of no less than 2,000 cP when dissolved in water at a concentration of 2% at 25° C. A high viscosity sodium alginate available from Sigma Aldrich has a viscosity of about 14,000 cP when dissolved in water at a concentration of 2% at 25° C.

An alginate can be cross-linked by one or more of the above mentioned cross-linking agents, preferably a mixture of glutaraldehyde and mineral acid (HCl, $HNO_3$, $H_2SO_4$, $H_3PO_4$, etc.), to form a water-insoluble alginate. When combined with cross-linked humic acic, a cross-linked alginate and/or a cross-linked blend of alginate and humic acid further lower the solubility of the cross-linked humic acid, thus providing a solid support to further immobilize the cross-linked humic acid.

In one embodiment, the at least one alginate used to form the water-insoluble membrane of the adsorbent comprises a low viscosity alginate or alginate salt. In another embodiment, the at least one alginate used to form the water-insoluble membrane of the adsorbent comprises a medium viscosity alginate or alginate salt. In still another embodiment, the at least one alginate used to form the water-insoluble membrane of the adsorbent comprises a high viscosity alginate or alginate salt. The at least one alginate used to form the water-insoluble membrane of the adsorbent can be ammonia alginate, sodium, potassium, magnesium or calcium alginate.

In some embodiments, the at least one alginate used to form the water-insoluble membrane of the adsorbent has a weight average molecular weight of 10,000-600,000 Da, or preferably 25,000-500,000 Da, or preferably 40,000-400,000 Da, or preferably 55,000-300,000 Da, or preferably 70,000-200,000 Da, or preferably 85,000-100,000 Da. In other embodiments, the at least one alginate used to form the water-insoluble membrane of the adsorbent has a weight average molecular weight of at least 20,000 Da, at least 50,000 Da, preferably at least 100,000 Da, more preferably at least 250,000 Da, more preferably at least 350,000 Da, or more preferably at least 400,000 Da, or more preferably at least 500,000 Da.

In some embodiments, the at least one alginate used to form the water-insoluble membrane of the adsorbent comprises one or more unmodified, or natural alginates.

Natural alginates may be modified to obtain synthetic alginates with improved biocompatibility and more desirable physiochemical properties, such as alginate polymer stability, pore size, and hydrophobicity/hydrophilicity. In other embodiments, the at least one alginate used to form the water-insoluble membrane of the adsorbent comprises one or more modified, or synthetic, alginates, such as those disclosed in U.S. Patent Application US20120308650 A1, incorporated herein by reference in its entirety. One embodiment of the modified alginate comprises one or more covalently modified monomers defined by Formula I,

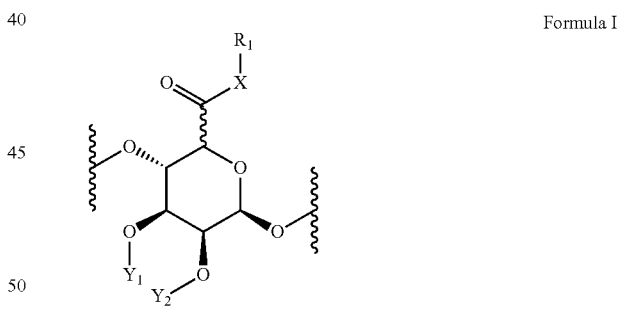

Formula I wherein, X is oxygen, sulfur, or NR; $R_1$ is hydrogen, or an organic grouping containing any number of carbon atoms, preferably 1-30 carbon atoms, more preferably 1-20 carbon atoms, more preferably 1-14 carbon atoms, more preferably 2-10 carbon atoms, more preferably 3-8 carbon atoms, more preferably 4-6 carbon atoms, and optionally including one or more heteroatoms such as oxygen, sulfur, or nitrogen grouping in linear, branched, or cyclic structural formats, representative $R_1$ groupings being alkyl, substituted alkyl, alkenyl, substituted alkenyl, alkynyl, substituted alkynyl, phenyl, substituted phenyl, aryl, substituted aryl, heteroaryl, substituted heteroaryl, alkoxy, substituted alkoxy, phenoxy, substituted phenoxy, aroxy, substituted aroxy, alkylthio, substituted alkylthio, phenylthio, substituted phenylthio, arylthio, substituted arylthio, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, aminoacid, poly(ethylene glycol), peptide, or polypeptide group; $Y_1$ and $Y_2$ independently are hydrogen or —PO(OR)$_2$; or $Y_2$ is absent, and $Y_2$, together with the two oxygen atoms to which $Y_1$ and $Y_2$ are attached form a cyclic structure as shown below,

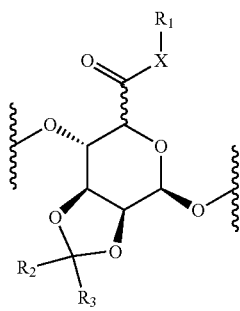

wherein n is an integer between 1 and 4; and $R_2$ and $R_3$ are, independently, hydrogen or an organic grouping containing any number of carbon atoms, preferably 1-30 carbon atoms, more preferably 1-20 carbon atoms, more preferably 1-14 carbon atoms, and optionally including one or more heteroatoms such as oxygen, sulfur, or nitrogen grouping in linear, branched, or cyclic structural formats, representative R groupings being alkyl, substituted alkyl, alkenyl, substituted alkenyl, alkynyl, substituted alkynyl, phenyl, substituted phenyl, aryl, substituted aryl, heteroaryl, substituted heteroaryl, alkoxy, substituted alkoxy, phenoxy, substituted phenoxy, aroxy, substituted aroxy, alkylthio, substituted alkylthio, phenylthio, substituted phenylthio, arylthio, substituted arylthio, carbonyl, substituted carbonyl, carboxyl, substituted carboxyl, amino, substituted amino, amido, substituted amido, polyaryl, substituted polyaryl, $C_3$-$C_{20}$ cyclic, substituted $C_3$-$C_{20}$ cyclic, heterocyclic, substituted heterocyclic, aminoacid, poly(ethylene glycol), peptide, or polypeptide group; or $R_2$ and $R_3$, together with the carbon atom to which they are attached, form a 3- to 8-membered unsubstituted or substituted carbocyclic or heterocyclic ring; and R is, independently for each occurrence, hydrogen or an organic grouping containing any number of carbon atoms, preferably 1-30 carbon atoms, more preferably 1-20 carbon atoms, more preferably 1-14 carbon atoms, and optionally including one or more heteroatoms such as oxygen, sulfur, or nitrogen grouping in linear, branched, or cyclic structural formats, representative R groupings being alkyl, substituted alkyl, alkenyl, substituted alkenyl, alkynyl, substituted alkynyl, phenyl, substituted phenyl, aryl, substituted aryl, heteroaryl, substituted heteroaryl, alkoxy, substituted alkoxy, phenoxy, substituted phenoxy, aroxy, substituted aroxy, alkylthio, substituted alkylthio, phenylthio, substituted phenylthio, arylthio, substituted arylthio, carbonyl, substituted carbonyl, carboxyl, substituted carboxyl, amino, substituted amino, amido, substituted amido, polyaryl, substituted polyaryl, $C_3$-$C_{20}$ cyclic, substituted $C_3$-$C_{20}$ cyclic, heterocyclic, substituted heterocyclic, aminoacid, poly(ethylene glycol), peptide, or polypeptide group.

In other embodiments, the at least one alginate used to form the water-insoluble membrane of the adsorbent may comprise a combination of at least one unmodified alginate and at least one modified alginate. In some embodiments, the mass ratio of the modified alginate(s) to the unmodified alginate(s) ranges from 15:1 to 1:15, 10:1 to 1:10, 5:1 to 1:5. 2:1 to 1:2, or 1:1.

Because the cross-linked alginates are a porous matrix/gel, when the immobilized cross-linked humic acid is contacted with the aqueous solution containing the cationic dyes, the aqueous solution can diffuse through the cross-linked alginates to contact the cross-linked humic acid.

In some embodiments, the cross-linked at least one alginate forming the water-insoluble membrane may be substituted by or mixed with cross-linked dextran gels, agar, gellan, chitosan, and curdlan. In other embodiments, the water-insoluble membrane may comprise cross-linked alginates and one or more of cross-linked dextran gels, agar, gellan, chitosan, and curdlan.

Hydroxyethyl cellulose is a gelling and thickening agent derived from cellulose, and can be cross-linked by one or more of the above mentioned cross-linking agents, preferably a mixture of glutaraldehyde and mineral acid (HCl, $HNO_3$, $H_2SO_4$, $H_3PO_4$, etc.), to form a water-insoluble hydroxyethyl cellulose, or a cross-linked blend of hydroxyethyl cellulose, at least one alginate, and humic acid when the at least one alginate and humic acid are also present during the cross-linking reaction according to the present disclosure. Without wishing to be bound by theory, it is believed that the cross-linked hydroxyethyl cellulose serves as a water-insoluble binder in the inventive adsorbent, and also improves the cationic dye removal efficiency of the adsorbent by enhancing the contact of the cross-linked humic acid with the aqueous solution due to the hydrophilic nature of the cross-linked hydroxyethyl cellulose and/or by further immobilizing the cross-linked humic acid. The cross-linked hydroxyethyl cellulose itself may have cationic dye adsorptive activity, and may work synergistically with the cross-linked humic acid to achieve a surprisingly high cationic dye removal efficiency of the adsorbent. It is contemplated that the hydroxyethyl cellulose used to form the adsorbent membrane may be modified to improve the cationic dye adsorption/removal efficiency even further.

In some embodiments, the hydroxyethyl cellulose used to form the water-insoluble membrane has a weight average molecular weight of 10,000 to 500,000 Da, preferably 25,000 to 400,000 Da, preferably 50,000 to 300,000 Da, preferably 75,000 to 250,000 Da, or preferably 100,000 to 200,000 Da. In other embodiments, the hydroxyethyl cellulose used to form the water-insoluble membrane has a weight average molecular weight of at least 10,000 Da, at least 25,000 Da, preferably at least 50,000 Da, preferably at least 100,000 Da, more preferably at least 150,000 Da, more preferably at least 200,000 Da, more preferably at least 250,000 Da, more preferably at least 300,000 Da, or more preferably at least 350,000 Da.

In some embodiments, the adsorbent may further comprise at least one water-insoluble binder selected from the group consisting of methyl cellulose, polyvinyl acetate, polyvinyl chloride, polystyrene and styrene-butadiene copolymers. The water-insoluble binder facilitates the formation of the membrane and strengthens the membrane formed on the substrate surface without affecting the adsorptive characteristics of the inventive adsorbent.

In the disclosed adsorbent, the adsorption activity comes from the water-insoluble membrane obtained by cross-linking humic acid, at least one alginate, and hydroxyethyl cellulose with a cross-linking agent, e.g. glutaraldehyde, preferably together with a mineral acid as a catalyzer, e.g. HCl, to form a cross-linked blend film or membrane, whereas the substrate does not have significant adsorption activity but provides a support for the membrane. In the cross-linked blend membrane, the components of humic acid involved in the cross-linkages may include amino acids, amino sugars, peptides, aliphatic acids, aliphatic and/or aromatic alcohols, and other aliphatic compounds. The components of the at least one alginate involved in the cross-linkages may include the carboxylic and aliphatic and enolic-hydroxyl groups. The components of hydroxyethyl cellulose involved in the cross-linkages may include one or more of the hydroxyethyl alcohol groups. All the above mentioned cross-linked components may cross-link among the same or one another via the cross-linking agent to form a blended statistical polymer. For example, the humic acid may be cross-linked to another humic acid, alginate, hydroxyethyl cellulose, or mixtures thereof. The weight ratio of humic acid:at least one alginate:hydroxyethyl cellulose in the membrane-forming solution (described below) may dictate the weight percentage of each substance in the cross-linked polymer. The weight percentages of the membrane-forming substances may be altered to alter the properties of the membrane, including the properties of cationic dye adsorption, such as adsorption capacity, adsorption efficiency, and adsorption kinetics, etc.

In some embodiments, in the water-insoluble membrane, humic acid is present in an amount of about 5-30%, preferably about 8-25%, preferably about 10-20%, or more preferably about 12-15%, of the total weight of the water-insoluble membrane; the at least one alginate is present in an amount of about 40-90%, preferably about 50-84%, preferably about 60-80%, or more preferably about 70-76%, of the total weight of the water-insoluble membrane; and hydroxyethyl cellulose is present in an amount of about 5-30%, preferably about 8-25%, preferably about 10-20%, or more preferably about 12-15%, of the total weight of the water-insoluble membrane. In other embodiments, in the water-insoluble membrane, the weight ratio of humic acid:at least one alginate:hydroxyethyl cellulose lies in the range (5-30):(40-90):(5-30), or preferably (8-25):(50-84):(8-25), or preferably (10-20):(60-80):(10-20), or more preferably (12-15):(70-76):(12-15).

The substrate of the adsorbent can comprise any suitable material which is inert or stable in water or an aqueous solution during a cationic dye adsorption process and which provides a surface for the disposition or attachment of the water-insoluble membrane. Non-limiting examples of the material the substrate may comprise include one or more of such polymers as polypropylene, polystyrene, PET (polyethylene terephthalate), polyimide, PEN (polyethylene naphthalate), agarose, acetate cellulose, and PC (polycarbonate), and other polymers, glass, plastic, rubber, a metal, an alloy, a ceramic, a carbonaceous material, sand, silicon, and silica.

The thickness and shape of the substrate can vary. Preferably, the substrate is just thick enough to provide sufficient support for the membrane and maintain the integrity of the adsorbent, e.g. the adsorbent does not break or disintegrate during the contacting with the aqueous solution to adsorb the cationic dyes, during the removal of the adsorbent from the aqueous solution when the adsorption is complete, and/or during the regeneration of the adsorbent, without adding unnecessary weight and/or volume to the adsorbent. Non-limiting examples of the shapes of the substrate include a granule, a pellet, a sphere, a powder, a woven fabric, a non-woven fabric, a mat, a felt, a block, and a honeycomb.

There are different ways of disposing the water-insoluble membrane on the substrate. For example, the humic acid, the at least one alginate, and the hydroxyethyl cellulose may first be dissolved in water or an aqueous solution to form a membrane-forming solution, and then the substrate may be immersed or dipped in the membrane-forming solution, or the membrane-forming solution may be sprayed onto the substrate, or the membrane-forming solution may be applied onto the surface of the substrate by brushing, etc, such that the membrane-forming solution forms a coating on the substrate. The substrate with the membrane-forming solution coating can be air dried or dried at an elevated temperature, e.g. in an heated oven, such that the wet coating of the membrane-forming solution turns into a dry membrane comprising the humic acid, the at least one alginate, and the hydroxyethyl cellulose, which are then cross-linked with one or more of the cross-linking agents described above to form the water-insoluble membrane conferring the adsorption activity of the adsorbent for the cationic dyes. In some embodiments, the above mentioned process of depositing and cross-linking the membrane-forming substances of humic acid, at least one alginate, and hydroxyethyl cellulose may be repeated one or more times to increase the coverage and/or thickness of the membrane on the substrate.

In some embodiments, in order to strengthen the attachment of the water-insoluble membrane to the substrate, one or more membrane-forming substances may comprise or may be modified to comprise a first molecular moiety, e.g. the alginate may be covalently conjugated with biotin, and the substrate may comprise or may be modified to comprise a second molecular moiety capable of binding to the first molecular moiety, preferably with high affinity. For example, the substrate may comprise a polymer, such as agarose, conjugated with avidin or streptavidin, or the substrate may comprise a plastic, such as polystyrene, of which surface is coated with avidin or streptavidin. Both avidin and streptavidin bind to biotin with high affinity. Conjugation of alginate with biotin is described by Polyak B l, Geresh S, Marks R S, Synthesis and characterization of a biotin-alginate conjugate and its application in a biosensor construction, Biomacromolecules. 2004 March-April; 5(2):389-96, incorporated herein by reference in its entirety. Conjugation of polymers, e.g. agarose, with avidin or streptavidin is well known in the art. Coating of a plastic surface with avidin or streptavidin is also well known in the art. As another example, the alginate may be covalently conjugated with heparin, as disclosed by Zuo Q l, Guo R, Liu Q, Hong A, Shi Y, Kong Q, Huang Y, He L, Xue W., Heparin-conjugated alginate multilayered microspheres for controlled release of bFGF., Biomed Mater. 2015 Jun. 4; 10(3):035008, incorporated herein by reference in its entirety. The substrate may be a plastic, such as polystyrene, of which surface may be coated with a protein or peptide that binds to heparin with high affinity. Heparin binding proteins are well known in the art, including, without limitation, fibroblast growth factor, azurocidin, and pleiotrophin. The peptide may be selected based on the regions of the heparin binding proteins that confer the heparin-binding activity. The techniques of coating of a plastic surface with a protein or a peptide are also well known in the art, one of which is disclosed by Cuccuru MA1, Dessi D, Rappelli P, Fiori P L, A simple, rapid and inexpensive technique to bind small peptides to polystyrene surfaces for immunoenzymatic assays, J Immunol Methods. 2012 Aug. 31; 382(1-2):216-9, incorporated herein by reference in its entirety. As still another example, the alginate may be covalently conjugated with a laminin peptide that binds to an integrin, as disclosed by Yamada Y l, Hozumi K, Katagiri F, Kikkawa Y, Nomizu M, Biological activity of laminin peptide-conjugated alginate and chitosan matrices, Biopolymers. 2010; 94(6):711-20, incorporated herein by reference in its entirety. The substrate may be again a plastic whose surface is coated with the integrin protein or a peptide derived from the integrin protein that confers the binding activity. As still another example, the substrate may be hollow glass microspheres coated with nanoparticles of $Fe_3O_4$, as disclosed in Chinese Patent No. CN103043916 B, incorporated herein by reference in its entirety. The nanoparticles of $Fe_3O_4$ confer the hollow glass beads with magnetic properties. Additionally, the nanoparticles of $Fe_3O_4$ coating the hollow glass microsphere substrate can bind to the humic acid of the water-insoluble membrane through coordination, as disclosed in Chinese Patent No. CN103752281 A, incorporated herein by reference in its entirety.

In some embodiments, the water-insoluble membrane covers at least 50%, preferably at least 60%, more preferably at least 70%, more preferably at least 80%, more preferably at least 90%, or more preferably at least 95%, of the surface of the substrate.

The thickness of the water-insoluble membrane disposed on the substrate may vary, depending, for example, on the concentrations of the humic acid, the at least one alginate, and the hydroxyethyl cellulose in the membrane-forming solution coating or disposing on the substrate, the duration of the coating or disposition, and/or the number of times of repeated coating or disposition. In some embodiments, the thickness of the water insoluble membrane is at least 50 μm, preferably at least 150 μm, more preferably at least 250 μm, more preferably at least 350 μm, more preferably at least 500 μm, more preferably at least 750 μm, more preferably at least 900 μm, or more preferably at least 1 mm. A suitably thick membrane provides sufficient adsorption capacity or sites and maintains integrity and stability under various adsorption conditions, including, but not limited to, the temperature of the adsorption process, the concentrations of the cationic dyes and the nature and concentrations of other compositions of the aqueous solution that can affect the integrity and stability of the adsorbent membrane, and the desired number of regeneration and reuse cycles of the adsorbent membrane.

In some embodiments, the pH of the aqueous solution is about 1-12, about 3-10, about 4-8, or about 5-7. In some embodiments, when the at least one cationic dye comprises methylene blue, the pH of the aqueous solution is preferably 6-10, or more preferably 7-9. In other embodiments, when the at least one cationic dye comprises rhodamine B, the pH of the aqueous solution is preferably 1 to 7, or more preferably 2-6, or more preferably 3-5.

In some embodiments, the at least one cationic dye is methylene blue, and the adsorbent removes at least 50%, preferably at least 60%, preferably at least 70%, more preferably at least 80%, or more preferably at least 90%, or more preferably at least 95%, of the methylene blue from the aqueous solution.

In some embodiments, the at least one cationic dye is rhodamine B, and the adsorbent removes at least 50%, preferably at least 60%, preferably at least 70%, more preferably at least 80%, or more preferably at least 90%, or more preferably at least 95%, of the rhodamine B from the aqueous solution The initial concentration of the rhodamine B in the aqueous solution affects the efficiency of removing rhodamine B from the aqueous solution with the adsorbent. The initial concentration of the rhodamine B in the aqueous solution is preferably lower than 75 mg/L, preferably lower than 60 mg/L, or more preferably lower than 50 mg/L.

The water-insoluble membrane of the adsorbent confers the dye adsorption activity. The concentration of the water-insoluble membrane contacting the aqueous solution containing the cationic dyes can vary, depending on the initial concentration of the cationic dyes in the aqueous solution, which may range from about less than 10 mg/L to 100 mg/L, the removal efficiency required, the availability of the adsorbent, the capacity for the treatment of the aqueous solution with the adsorbent, e.g. the size of a vessel used for batch adsorption, and the capacity for filtration of the adsorbent from the aqueous solution to remove and/or regenerate the adsorbent, etc. A typical concentration of the water-insoluble membrane treating the aqueous solution is about 0.04-0.64 g/100 mL of the aqueous solution, about 0.08-0.50 g/100 mL of the aqueous solution, or about 0.10-0.40 g/100 mL of the aqueous solution, or about 0.15-0.30 g/100 mL of the aqueous solution, or about 0.20-0.25 g/100 mL of the aqueous solution.

Besides batch adsorption, e.g. by letting the aqueous solution remain in contact with the adsorbent for a time sufficient to remove the cationic dyes, granular particles of the adsorbent may be installed in a fixed bed reactor or fluidized bed reactor. For example, the aqueous solution containing the cationic dyes can be applied to a fixed bed column of the adsorbent, and the effluent of the column comprises the treated aqueous solution with reduced concentrations of the cationic dyes. In some embodiments, the fixed bed reactor of the adsorbents comprises a cartridge for easy carry and use. For example, such a cartridge can be attached to a faucet of tap water or ground water, or installed in a container where the aqueous solution passes through the cartridge from an upper level of the container, with the treated aqueous solution exiting the cartridge at a lower level of the container with reduced concentrations of the cationic dyes. Further, the cartridge can include other cationic dye adsorbents such as activated carbon.

Alternatively, the adsorbent can form a fluidized bed reactor with the aqueous solution containing the cationic dyes, for example, by introducing the pressurized aqueous solution through the particulate medium of the adsorbent. In the fluidized bed reactor, contact between the adsorbent and the aqueous solution is greatly enhanced as compared to a fixed bed column or reactor, leading to a higher removal efficiency of the cationic dyes from the aqueous solution.

Additionally, the adsorbent can take a variety of forms that may be or may not be shaped by the forms of the substrate to facilitate removal of the cationic dyes from the aqueous solution and/or removal of the adsorbent from the aqueous solution when the adsorption is complete, and/or when the adsorption capacity of the adsorbent is exhausted and the adsorbent needs to be regenerated. Non-limiting examples of the forms include a granule, a pellet, a sphere, a powder, a woven fabric, a non-woven fabric, a mat, a felt, a block, and a honeycomb.

In some embodiments, the method further comprises removing the adsorbent from the treated aqueous solution. For example, the adsorbent in powder form may be injected into an aqueous solution storage tank and then removed by filtration, centrifugation, or settling. The adsorbent in fiber form may be inserted in a section of the aqueous solution or waste water treatment piping or trench, and optionally be removed for regeneration when its adsorption capacity has been exhausted and replaced by fresh adsorbent. In some embodiments, the adsorbent may further comprise a magnetic material, for example, the adsorbent may be in the form of a magnetic sphere or bead, such that the adsorbent can be easily removed from the treated aqueous solution with a magnet.

In one embodiment, the method further comprises regenerating the adsorption ability of the adsorbent. In some embodiments, the regenerating the adsorption ability of the adsorbent comprises treating the adsorbent with at least one mineral or strong acid, e.g. a HCl solution at a concentration of 0.01-1 M, preferably 0.05-0.8 M, preferably 0.08-0.5 M, preferably 0.1-0.3 M, by, for example and without limitation, soaking the adsorbent in the HCl solution with agitation or ultra-sonication for a period of time, e.g. about 2-10 hours, about 3-8 hours, or about 4-6 hours, to effectively desorb the cationic dyes from the adsorbent. One or more other mineral or strong acids and/or organic acids that can be used in place of HCl or in combination with HCl to regenerate the adsorption ability of the adsorbent include, without limitation, nitric acid, hydrobromic acid, hydroiodic acid, formic acid, hydrofluoric acid, sulfuric acid, and chloric acid, acetic acid, propionic acid, butyric acid, valeric acid, caproic acid, oxalic acid, lactic acid, malic acid, citric acid, benzoic acid, carbonic acid, and the like. After the acid treatment, in some embodiments, the membrane of the adsorbent may be thoroughly washed with distilled water by soaking or rinsing till the pH of the water from the washing is neutral. In some embodiments, the adsorbent, particularly the water-insoluble membrane, is dried and reused. In some embodiments, the adsorbent undergoes 1-10 cycles, or 2-8 cycles, or 3-7 cycles, or 4-6 cycles, of regeneration-reuse without a significant loss of the adsorption capacity for the cationic dyes.

In another embodiment, the method of using the adsorbent to remove the cationic dyes from the aqueous solution may take a form of continuous and/or multi-stage adsorption with the adsorbent. For example, multiple fixed bed columns or reactors of the adsorbent or, more broadly, multiple adsorption units of any suitable modes or configurations and their combinations, e.g. batch adsorption, cartridge, fluidized bed reactor, etc., can be set up to remove the cationic dyes from the aqueous solution in a parallel and/or sequential manner. In some embodiments, the adsorption columns, reactors, or units set up in the parallel fashion may be standby columns, reactors, or units ready to replace another set of parallel columns, reactors, or units whose adsorption capacity has been exhausted to make the removal operation continuous. The adsorbent in replaced columns, reactors, or units may be regenerated and reused. In other embodiments, the adsorption columns, reactors, or units set up in the sequential or serial fashion allow the cationic dyes to be removed from the aqueous solution through multiple stages to achieve a high removal efficiency.

In some embodiments, the aqueous solution is contacted with the adsorbent at a temperature of about 4-100° C., preferably about 10-90° C., preferably about 20-80° C., preferably about 30-70° C., or preferably about 40-60° C.

In some embodiments, the aqueous solution is contacted with the adsorbent at a pressure of about 1-100 bar, about 1-80 bar, preferably about 1-50 bar, preferably about 1-30 bar, preferably about 1-20 bar, or preferably about 1-10 bar.

Having generally described this invention, a further understanding can be obtained by reference to certain specific examples which are provided herein for purposes of illustration only and are not intended to be limiting unless otherwise specified.

Example 1

Materials and Methods

1. Materials 2-hydroxy ethyl cellulose (HEC) ($M_w$~250,000 Da), methylene blue (MB) ($M_w$~373.9), and rhodamine B (RhB) ($M_w$~479.01) were procured form Sigma Aldrich Co. Sodium alginate (SA) and sodium salt of humic acid (HA) used for the preparation of the water-insoluble membrane of the adsorbent were obtained from Himedia, Mumbai. Glutaraldehyde (GA) (25% solution) was obtained from Merck India Ltd. NaOH and HCl required for pH studies were of analytical grade. All the chemicals were used without further purification.

2. Methods 2.1. Preparation of the Adsorbent 0.4 g of HA, 2.2 g of SA, and 0.4 g of HEC were dissolved in 100 ml of distilled water for over 24 h to obtain a membrane-forming solution, with the combined weight of the membrane-forming substances HA, SA, and HEC being 3% of the total weight of the membrane-forming solution. After the dissolution, the membrane-forming solution was subjected to centrifugation to remove any undissolved particles. The membrane-forming solution was then poured onto a polypropylene substrate pasted on a glass plate. The polypropylene substrate provided a strong support for the adsorbent membrane and made the handling of the adsorbent membrane convenient and easy. The polypropylene substrate of which surface was coated with the membrane-forming solution was then dried in an oven to form a dried membrane coating the surface of the polypropylene substrate. To cross-link the dried membrane comprising the HA, the SA, and the HEC, the polypropylene substrate with the dried membrane coating was immersed in an aqueous solution containing 70% methanol, 2.5 wt % HCl and 2.5 wt % GA for 4 h to form the adsorbent. The cross-linked water-insoluble membrane of the adsorbent was then thoroughly washed with distilled water before being subjected to characterization and dye removal studies.

2.2. Determination of the Point of Zero Charge of the Water-Insoluble Membrane of the Adsorbent Zero point charge ($P_{zc}$) of the adsorbent membrane describes the condition at which the surface of the adsorbent membrane has zero electrical charge density. $P_{zc}$ was determined by a conventional method. Specifically, 25 ml of 0.1 M NaCl solution was placed in each of a series of 100 ml Erlenmeyer flasks, with the pH of the 0.1 M NaCl solution in each flask adjusted to a value between 1 and 9 by the addition of a 0.1 M HCl solution or a 0.1 M NaOH solution. The pH of the solution was measured on EQUIP-TRONIC (Model EQ-610). The initial pH of the 0.1 M NaCl solution was designated as $pH_1$. 0.1 g of the adsorbent comprising the adsorbent membrane disposed on the polypropylene substrate was added to each of the flasks containing the pH adjusted 0.1 M NaCl solutions. The flasks were placed on an orbital shaker (Scigenic Biotech) at room temperature and shaken at 150 rpm till no difference in the pH values was observed between two successive readings. The equilibrium pH was designated as $pH_e$ which was used to calculate $\Delta pH$ ($pH_1-pH_e$). A graph of $\Delta pH$ against $pH_1$ gave the $P_{zc}$ value at which the $\Delta pH$ is equal to zero.

2.3. Membrane Characterization

The surface of the adsorbent membrane was investigated by Scanning Electron Microscopy (SEM). In order to confirm the adsorption of dye on the membrane, elemental mapping and energy dispersive X-ray (EDX) analysis were carried out. For this study, the adsorbent membrane was initially deposited with gold by sputtering for increased conductivity. Fourier transform infrared spectra (FTIR) of the adsorbent membrane before and after the adsorption of the cationic dyes were recorded on a Perkin Elmer Spectrum 100 apparatus.

2.4. Dye Removal Studies

The cationic dye removal efficiency and the amount of dye adsorbed or removed per unit mass of the adsorbent membrane of the adsorbent were investigated by varying the initial dye concentration, adsorbent dosage, pH and adsorption time. All the experiments were carried out using batch adsorption on an orbital shaker at 27° C. and at a shaking speed of 150 rpm. For pH studies and adsorption kinetic studies, the concentration of the dye was fixed at 50 mg/L. The concentration of the dye before and after adsorption was measured using ultraviolet-visible (UV-Vis) spectrophotometer (Analytikjena Specord S600). The concentrations of MB and RhB were measured at the wavelength of 665 nm and 554.5 nm, respectively. From the initial and final concentrations, the dye removal efficiency (%) was calculated according to Equation (1):

$$\text{Dye Removal (\%)} = \left(1 - \frac{C_e}{C_0}\right) \times 100 \quad (1)$$

Where $C_e$ and $C_0$ are the equilibrium and initial dye concentrations in mg/L, respectively. The amount of dye adsorbed on the adsorbent membrane was calculated according to Equation (2)

$$q_t = \frac{(C_0 - C_t)V}{m} \quad (2)$$

Where $q_t$ is the amount of dye adsorbed per unit mass of the adsorbent membrane (mg/g), m is the mass of the adsorbent membrane (g), V is the volume of the dye solution (L). As mentioned above, $C_0$ (mg/L) is the initial dye concentration and $C_t$ (mg/L) is the dye concentration at time t.

2.5. Adsorbent Membrane Regeneration and Reuse

The regeneration and reusability of the adsorbent membrane was studied by subjecting the adsorbent membrane to multiple adsorption-desorption-adsorption cycles. For desorption, the membrane adsorbed with the dye was added to a 0.1 M HCl solution placed in a 100 ml Erlenmeyer flask. The flask was agitated on an orbital shaker at 150 rpm for 5 h. Afterwards, the membrane was thoroughly washed with distilled water till the pH of the distilled water collected from the washing was neutral. The membrane was dried and then used again for dye adsorption. The adsorbent membrane was subjected to the adsorption-desorption cycle repeatedly for four times to determine its reusability.

2.6. Determination of the Weight of the Adsorbent Membrane

In the following examples, a desired amount of the adsorbent was cut into small pieces, with each piece having an area of approximately 0.5 cm². Cutting of the adsorbent into small pieces ensured a large surface area of the membrane available for dye adsorption.

The adsorbent comprises the water-insoluble HA/SA/HEC membrane and the polypropylene substrate support on which the membrane is disposed. Experiments performed with the polypropylene substrate support alone indicated that it did not play any major role in the dye adsorption process. In order to study the effect of the adsorbent dosage on the dye adsorption, the weight of the water-insoluble HA/SA/HEC membrane was the determining factor. To determine the weight of the water-insoluble HA/SA/HEC membrane in a specific amount of the adsorbent, the polypropylene substrate was weighed initially, with the weight designated as W1. After the coating of the polypropylene substrate with the HA/SA/HEC, the cross-linking of the HA/SA/HEC to form the water-insoluble HA/SA/HEC membrane of the adsorbent, and the drying of the adsorbent, the adsorbent was weighed, with the weight designated as W2. The difference between W2 and W1 was the weight of the water-insoluble HA/SA/HEC membrane that conferred the adsorption activity. Hence, when the total weight of the adsorbent was 0.1 g, the weight of the water-insoluble HA/SA/HEC membrane was 0.02 g. Likewise, when the total weight of the adsorbent was 0.2 g, the weight of the water-insoluble HA/SA/HEC membrane was 0.05 g. When the total weight of the adsorbent was 0.3 g, the weight of the water-insoluble HA/SA/HEC membrane was 0.08 g. The determination of the weight of the water-insoluble HA/SA/HEC membrane in each of the above amounts of the adsorbent was performed in triplicates to minimize error.

In the following examples, the amount of the dye adsorbed per unit mass of the adsorbent was calculated based on the unit mass of the water-insoluble HA/SA/HEC membrane of the adsorbent.

Example 2

Characterization of the Adsorbent Membrane

1. Point of Zero Charge of the Adsorbent Membrane

Referring to FIG. 1, the point of zero charge ($P_{zc}$) of the adsorbent membrane was 3.50. The acidic nature of the surface may be due to the presence of carboxyl and phenolic groups on HA and acid groups on SA. The membrane hence was positively charged at a pH below 3.50, and was negative charged at a pH above 3.50, indicating that at a pH above $P_{zc}$ adsorption of cations is favored, whereas adsorption of anions is favored at a pH below $P_{zc}$.

2. SEM and FTIR Analysis of the Adsorbent Membrane

Figure 2:
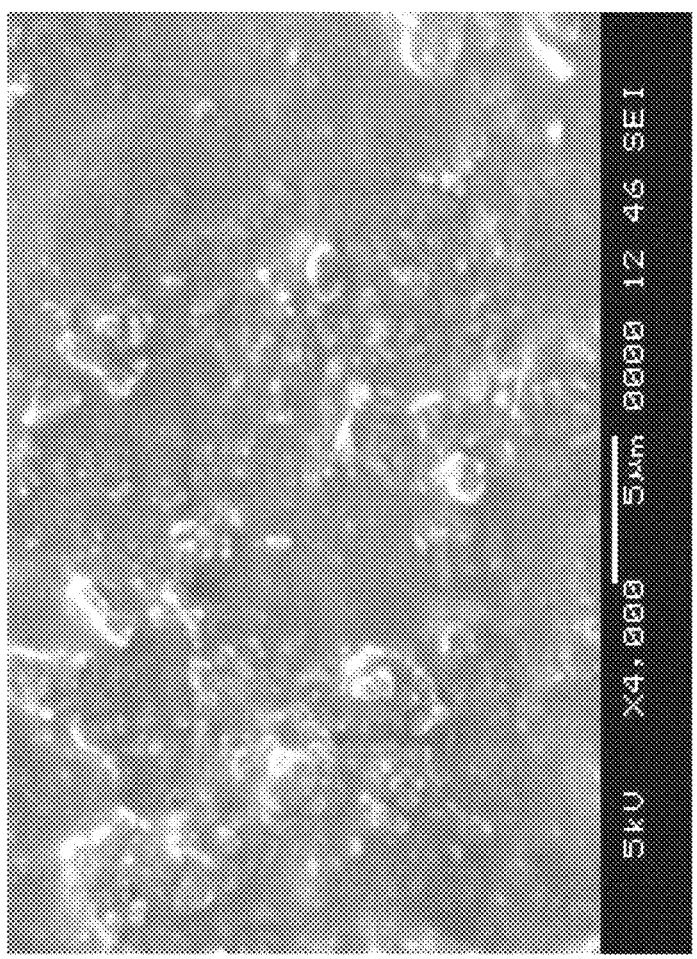
FIG. 2 is an SEM image of the dye-free adsorbent membrane according to Example 2.
Figure 5:
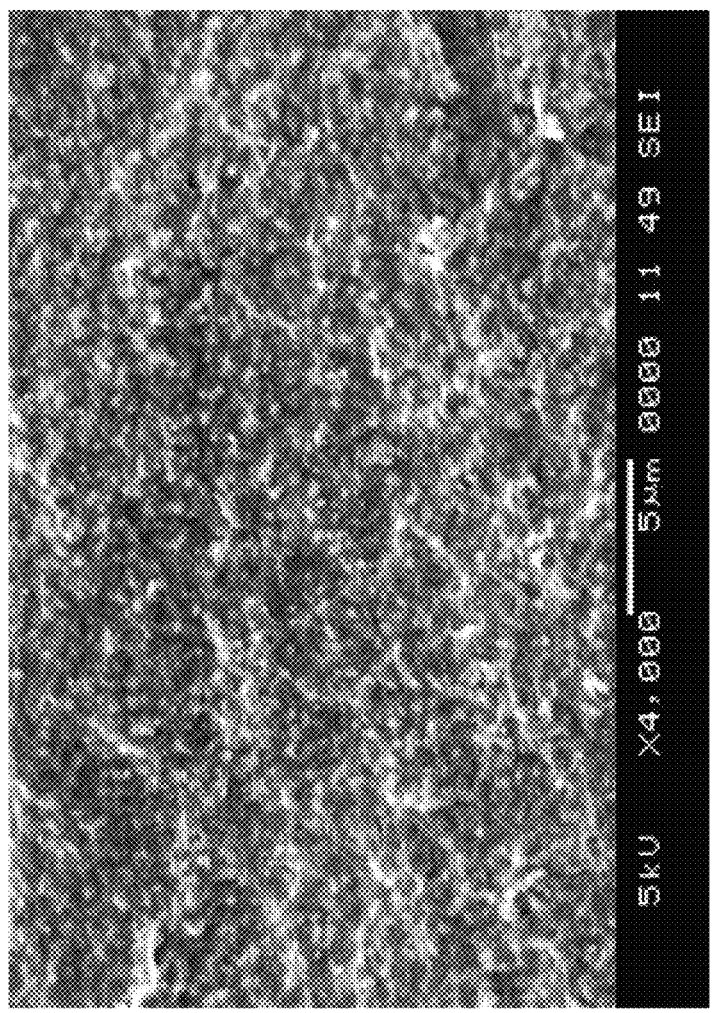
FIG. 5 is an SEM image of the adsorbent membrane adsorbed with MB according to Example 2.
Figure 6:
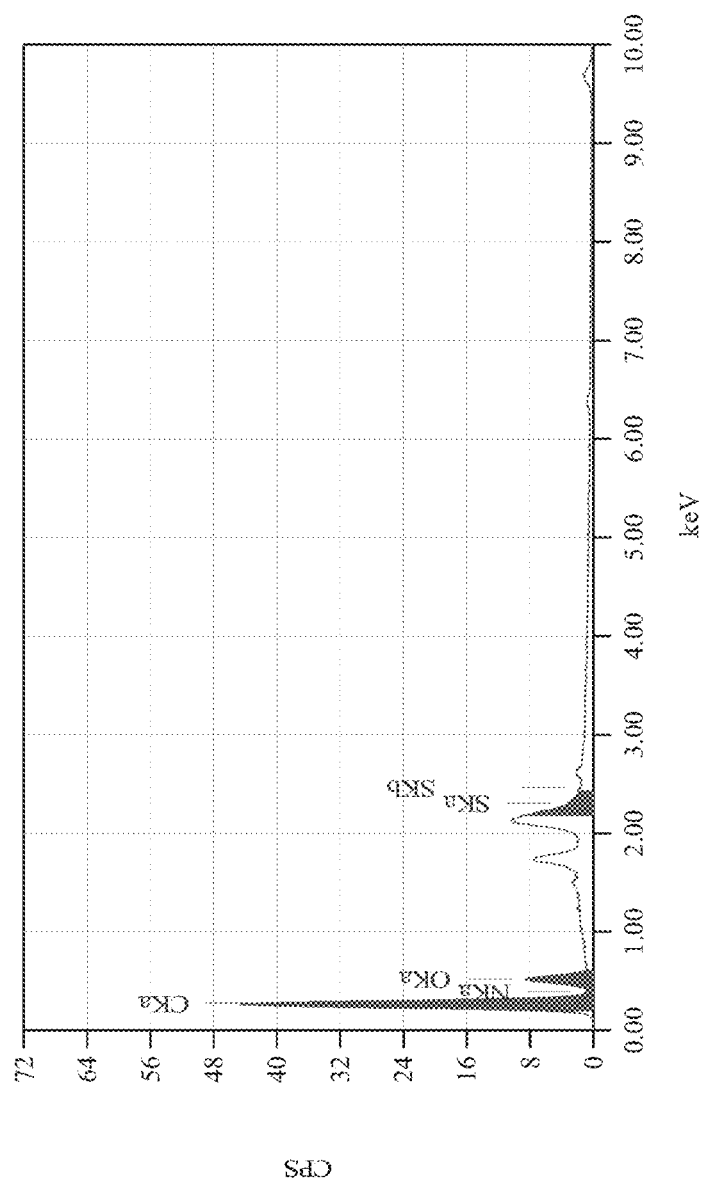
FIG. 6 is a graphical presentation of the EDX spectra of the adsorbent membrane adsorbed with MB according to Example 2.
Figure 8:
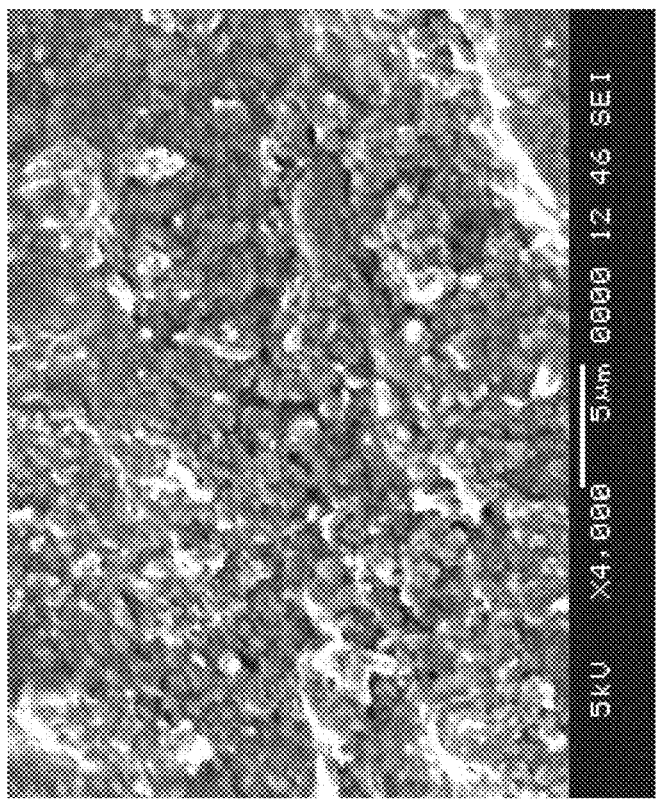
FIG. 8 is an SEM image of the adsorbent membrane adsorbed with RhB according to Example 2.
Figure 9:
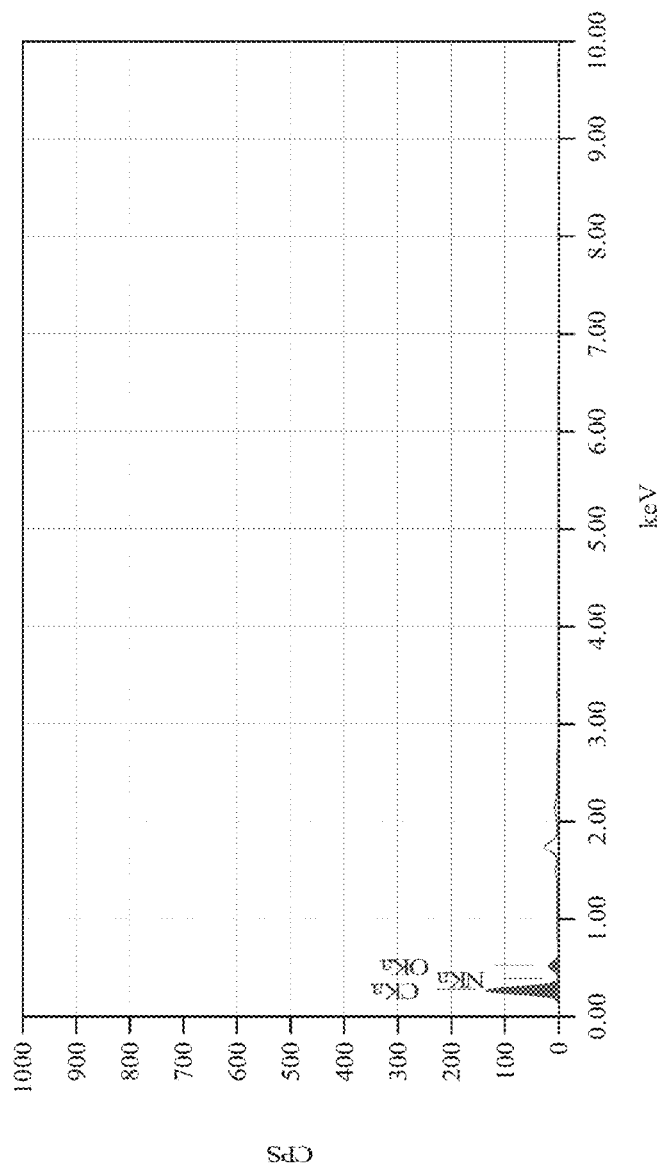
FIG. 9 is a graphical presentation of the EDX spectra of the adsorbent membrane adsorbed with RhB according to Example 2.
Figure 10A:
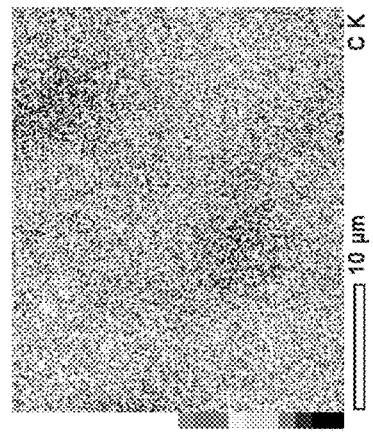
FIGS. 10A-10C are graphical presentation of the elemental mapping result of the adsorbent membrane adsorbed with RhB according to Example 2.
Figure 10B:
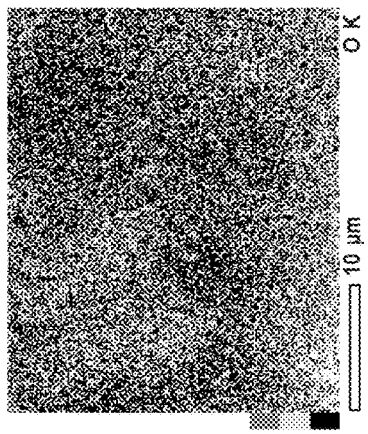
Figure 10C:
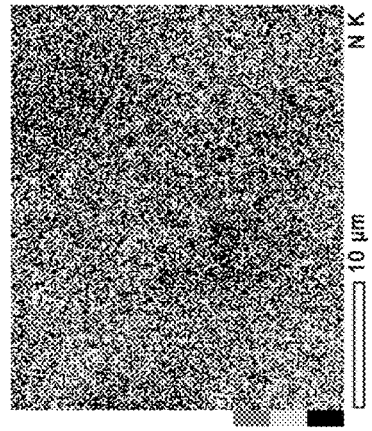

Referring to FIG. 2, the surface of the adsorbent membrane without any dye adsorbed appeared to be relatively smooth in comparison to the surface of the adsorbent membrane adsorbed with MB shown in FIG. 5, and in comparison to the surface of the adsorbent membrane adsorbed with RhB shown in FIG. 8. The surface of the membrane adsorbed with the dye appeared rough, probably due to the dye aggregates formed on the membrane surface.

Figure 3:
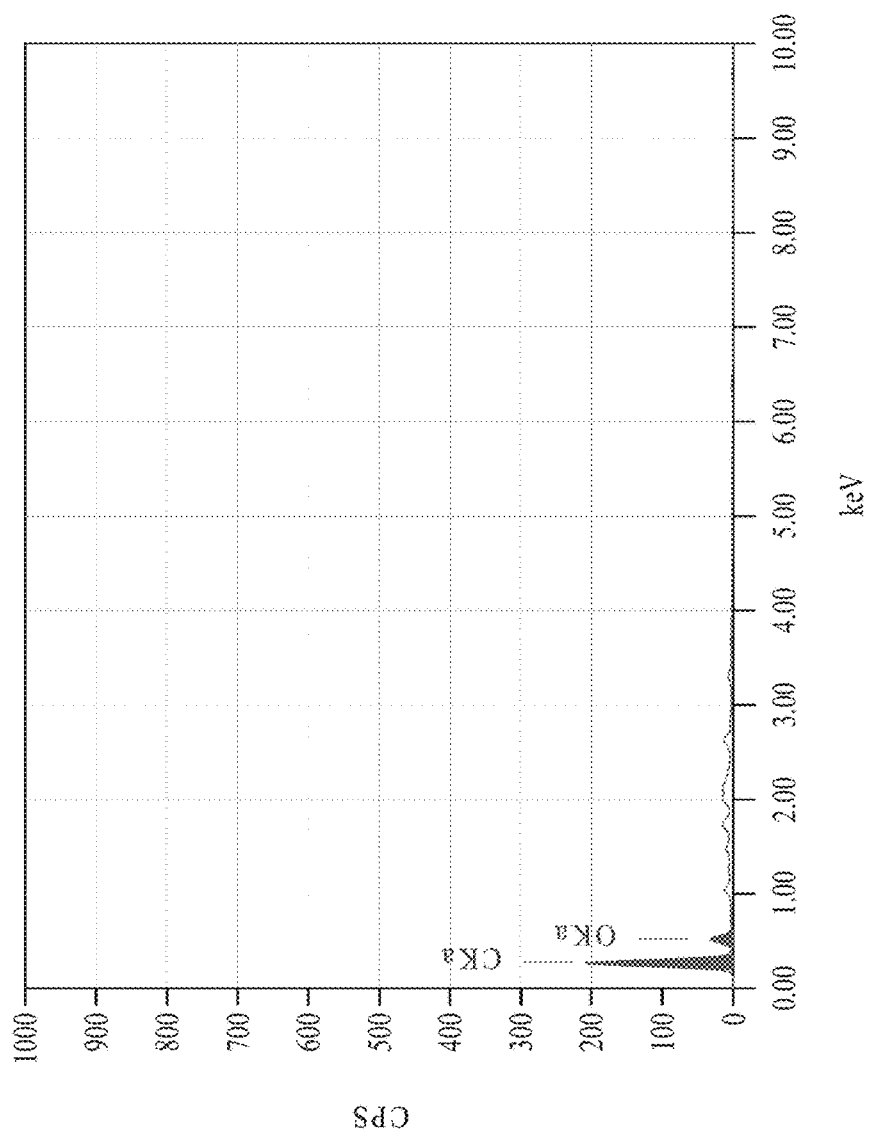
FIG. 3 is a graphical presentation of the EDX spectra of the dye-free adsorbent membrane according to Example 2.
Figure 4B:
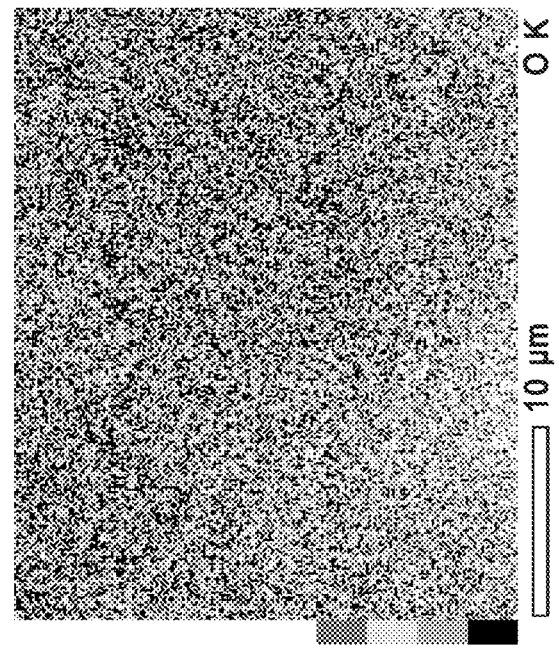
FIGS. 4A and 4B are graphical presentation of the elemental mapping result of the dye-free adsorbent membrane according to Example 2.
Figure 4A:
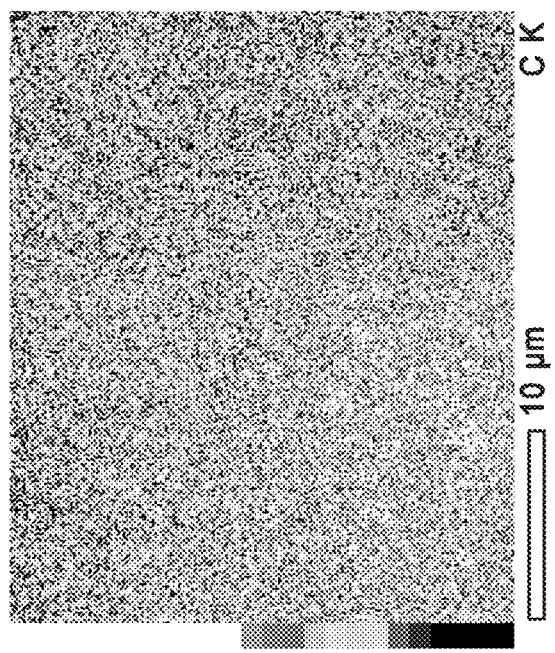
Figure 12:
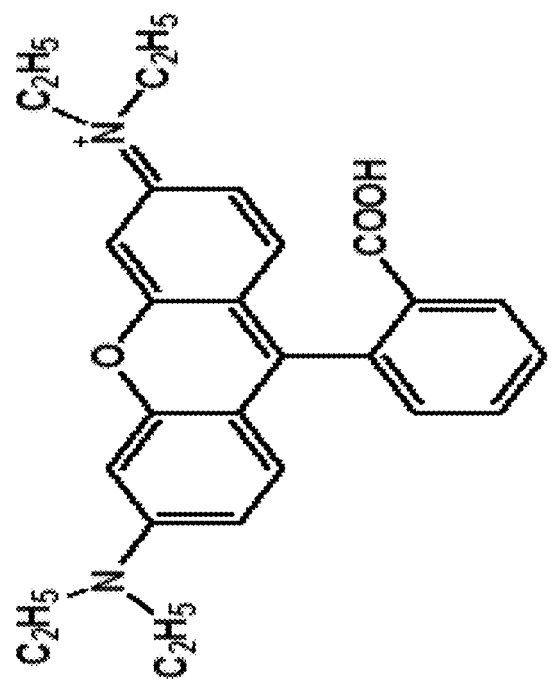
FIG. 12 is a graphical presentation of the chemical structure of RhB according to Example 2.
Figure 11:
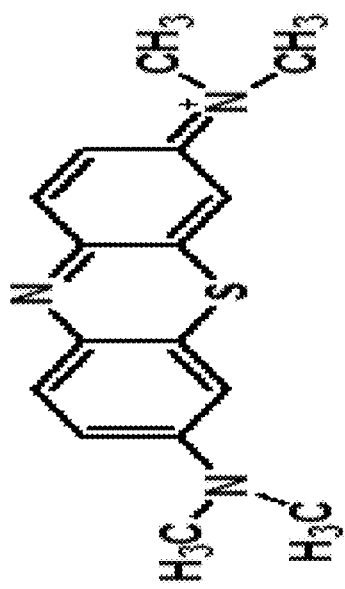
FIG. 11 is a graphical presentation of the chemical structure of MB according to Example 2.

Dye adsorption was further confirmed by elemental mapping and EDX analysis. Comparing FIG. 6 and FIGS. 7A, 7B, 7C, and 7D, which are the EDX spectra and elemental mapping result of the membrane adsorbed with MB, respectively, with FIG. 3 and FIGS. 4A and 4B, which are the EDX spectra and elemental mapping result of the dye-free membrane, respectively, the presence of the nitrogen and sulfur peaks in the EDX spectra confirmed that MB had been adsorbed on the membrane, since MB contains both nitrogen and sulfur as shown in FIG. 11 depicting the chemical structure of MB. Referring to FIG. 9 and FIGS. 10A, 10B, and 10C, which are the EDX spectra and elemental mapping result of the membrane adsorbed with RhB, respectively, the presence of the nitrogen peak in the EDX spectra confirmed that RhB had been adsorbed on the membrane, since RhB contains nitrogen as shown in FIG. 12 depicting the chemical structure of RhB.

Figure 13:
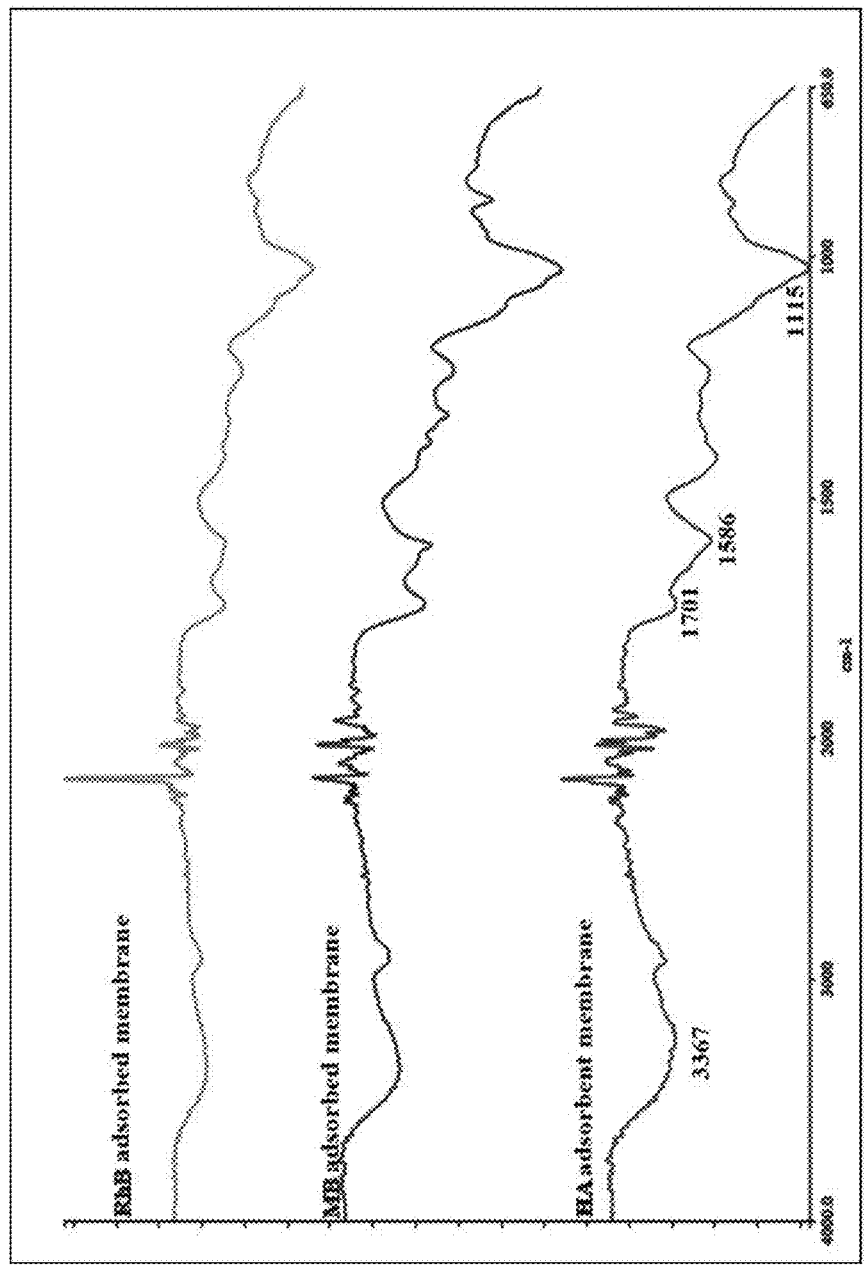
FIG. 13 is a graphical presentation of the FTIR spectra of the dye-free adsorbent membrane, the adsorbent membrane adsorbed with MB, and the adsorbent membrane adsorbed with RhB according to Example 2.

Referring to FIG. 13, the FTIR spectra of the dye-free adsorbent membrane displayed characteristic peaks at 3367 cm$^{-1}$ corresponding to the OH stretching frequency of the carboxyl and phenol groups, at 1586 cm$^{-1}$ corresponding to the C=O stretching frequency of the conjugated carbonyl group, at 1701 cm$^{-1}$ corresponding to the C=O stretching frequency of the carbonyl group in SA, and at 1115 cm$^{-1}$ corresponding to the C=O stretching frequency. When MB or RhB was adsorbed on the membrane, the spectra of the membrane exhibited a decrease in the peak intensity at 3367 cm$^{-1}$ corresponding to the OH stretching frequency, indicating an interaction between the carboxylate ions of the adsorbent with the cationic dye. The rest of the spectra of the dye-adsorbed membranes remained mostly unchanged compared with that of the dye-free membrane, indicating electrostatic interactions and a lack of any chemical bond formation between the adsorbent membrane and the dyes. The concentration of the dyes on the membrane surface was too low to give rise to any noticeable peaks in the IR spectra of the dye adsorbed membrane.

Example 3

Effect of the initial dye concentration on the amount of dye adsorbed or removed per unit mass of the adsorbent membrane Solutions containing MB or RhB at six different initial concentrations, i.e. 5, 15, 30, 50, 75, and 100 mg/L, were prepared with a pH of 7, and 0.3 g of the adsorbent was added to each solution.

Figure 14:
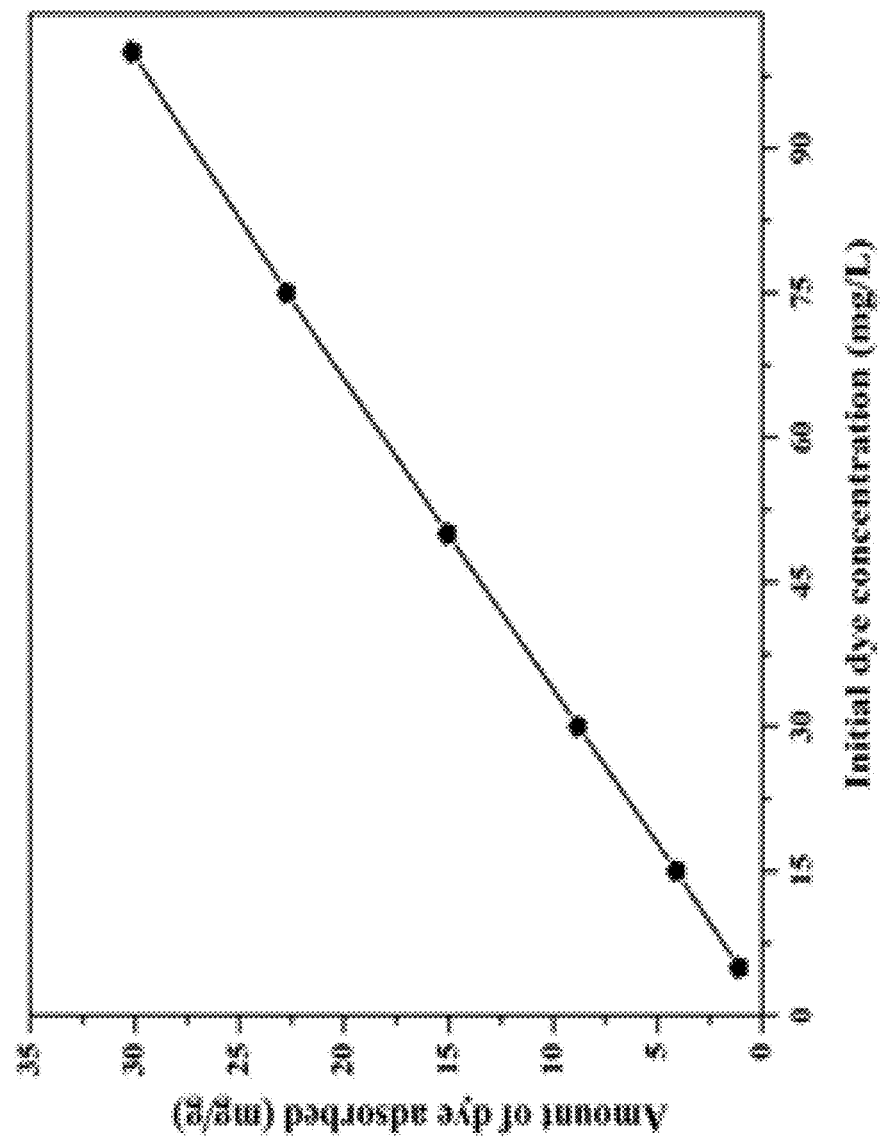
FIG. 14 is a graphical presentation of the effect of the initial concentration of MB on the amount of MB adsorbed per unit mass of the adsorbent membrane according to Example 3.
Figure 15:
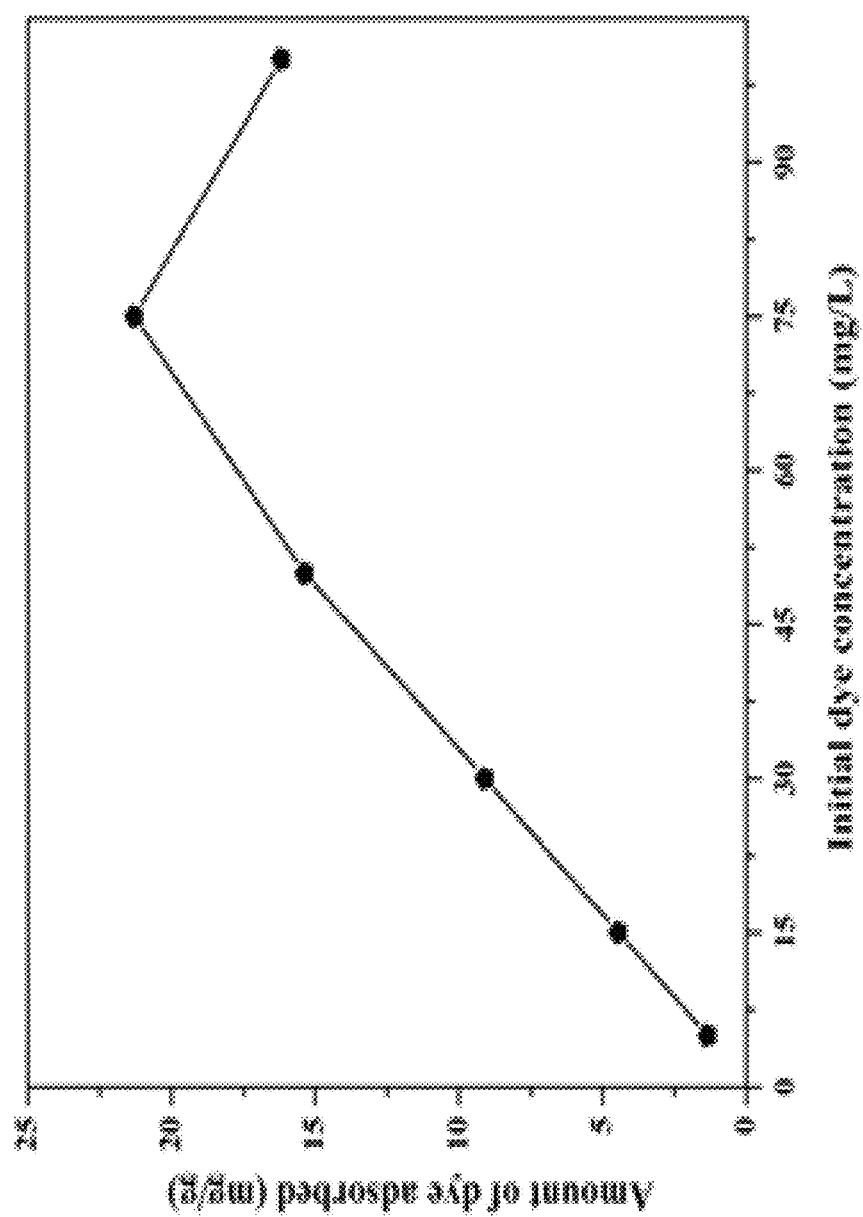
FIG. 15 is a graphical presentation of the effect of the initial concentration of RhB on the amount of RhB adsorbed per unit mass of the adsorbent membrane according to Example 3.

The initial dye concentration plays a major role in counteracting the mass transfer resistance of the dye molecules between the aqueous phase and the solid phase. The increase in dye concentration serves as a driving force to overcome the resistance, increasing the probability of collision between the dye molecules and the adsorbent and leading to higher adsorption (See S. S. Baral, N. Das, G. Roy Chaudhury, S. N. Das, A preliminary study on the adsorptive removal of Cr(VI) using seaweed, *Hydrilla verticillata*, J. Hazard. Mater., 171 (2009) 358-369, incorporated herein by reference in its entirety). Referring to FIG. 14, increasing the initial concentration of MB from 5 mg/L to 100 mg/L led to an increase in the amount of MB adsorbed on the adsorbent. Referring to FIG. 15, by contrast, increasing the initial concentration of RhB from 5 mg/L to 75 mg/L led to an increase in the amount of RhB adsorbed on the adsorbent, however, a further increase in the initial concentration from 75 mg/L to 100 mg/L led to a decrease in the amount of RhB adsorbed on the adsorbent. In both studies presented in FIG. 14 and FIG. 15, the adsorption was performed at pH 7 and with 0.3 g of the adsorbent. While not intending to be limited or bound in any way by theory, it is believed that at higher dye concentrations, the chance of formation of dye aggregates on the membrane may increase, resulting in fewer vacant adsorption sites on the membrane. A high molecular weight dye, e.g. RhB, may have a stronger negative effect of the concentration-induced aggregation on the adsorption capacity of the membrane than a low molecular weight dye, e.g. MB.

Example 4

Effect of the Adsorbent Dosage on the Amount of Dye Adsorbed or Removed Per Unit Mass of the Adsorbent Membrane and the Dye Adsorption/Removal Efficiency of the Adsorbent To determine the effect of the adsorbent dosage on the amount of the dye adsorbed on the adsorbent (membrane), a specific amount of the adsorbent was added to 25 ml of a dye solution with an initial concentration of 50 mg/L or 100 mg/L of MB or RhB. More specifically, in the study presented in FIG. 16, the initial concentration of MB was 50 mg/L. In the study presented in FIG. 17, the initial concentration of RhB was 50 mg/L. In the study presented in FIG. 18, the initial concentration of MB was 100 mg/L. In the study presented in FIG. 19, the initial concentration of RhB was 100 mg/L.

Figure 16:
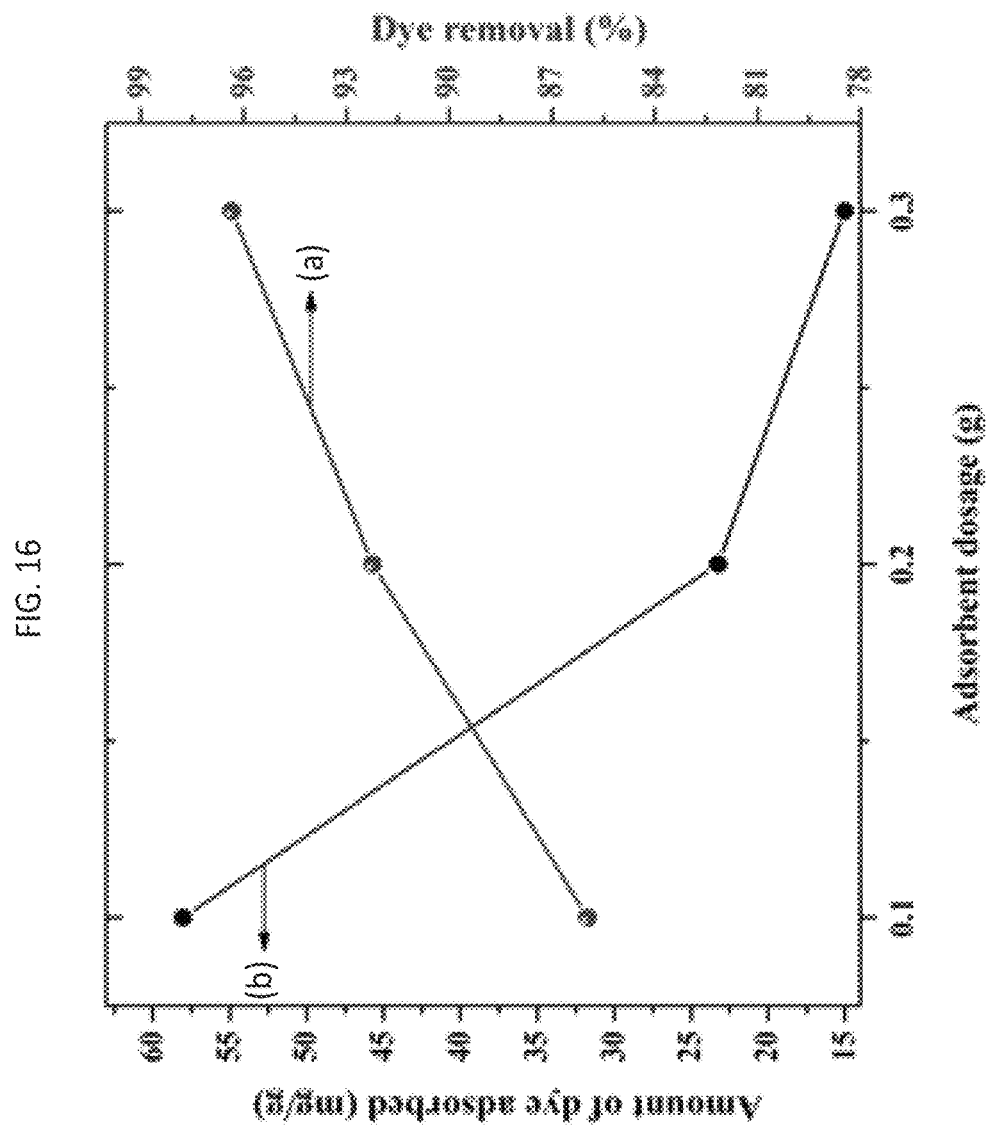
FIG. 16 is a graphical presentation of the effect of the adsorbent dosage on the MB removal efficiency of the adsorbent represented by line (a), and of the effect of the adsorbent dosage on the amount of MB adsorbed per unit mass of the adsorbent membrane represented by line (b), with the initial concentration of MB at 50 mg/L, according to Example 4.
Figure 17:
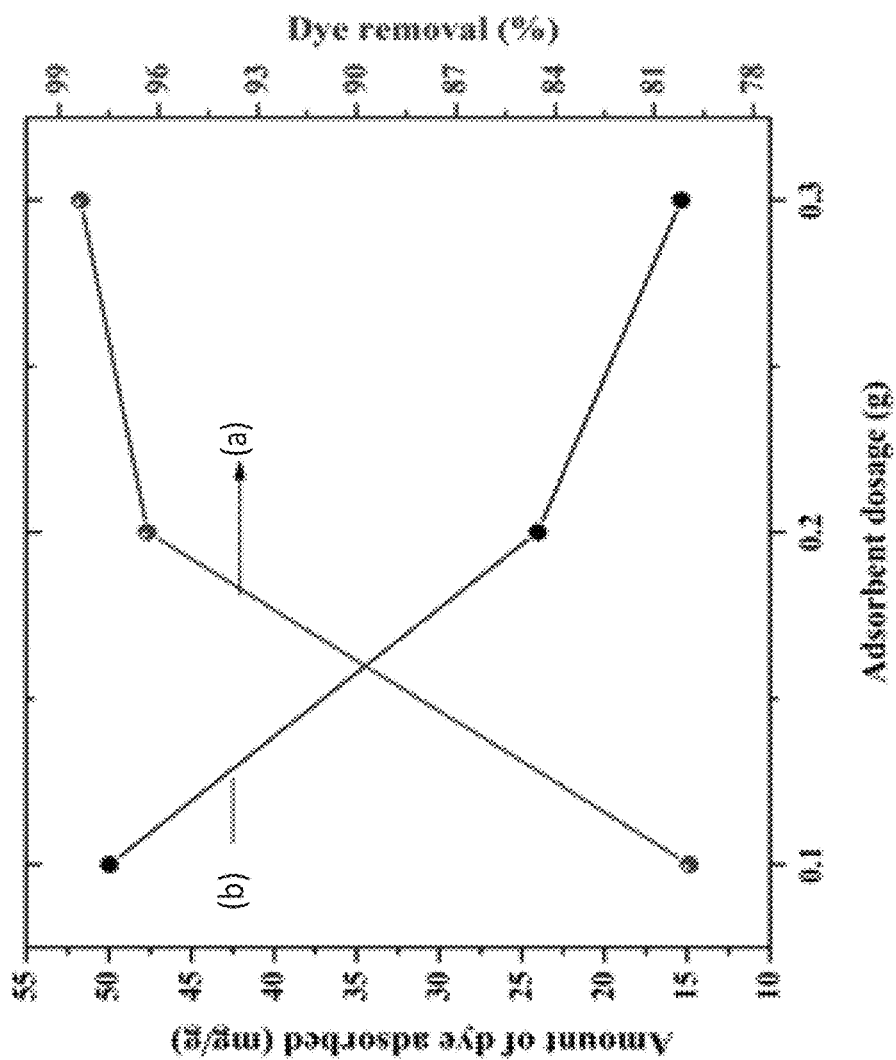
FIG. 17 is a graphical presentation of the effect of the adsorbent dosage on the RhB removal efficiency of the adsorbent represented by line (a), and of the effect of the adsorbent dosage on the amount of RhB adsorbed per unit mass of the adsorbent membrane represented by line (b), with the initial concentration of RhB at 50 mg/L, according to Example 4.
Figure 18:
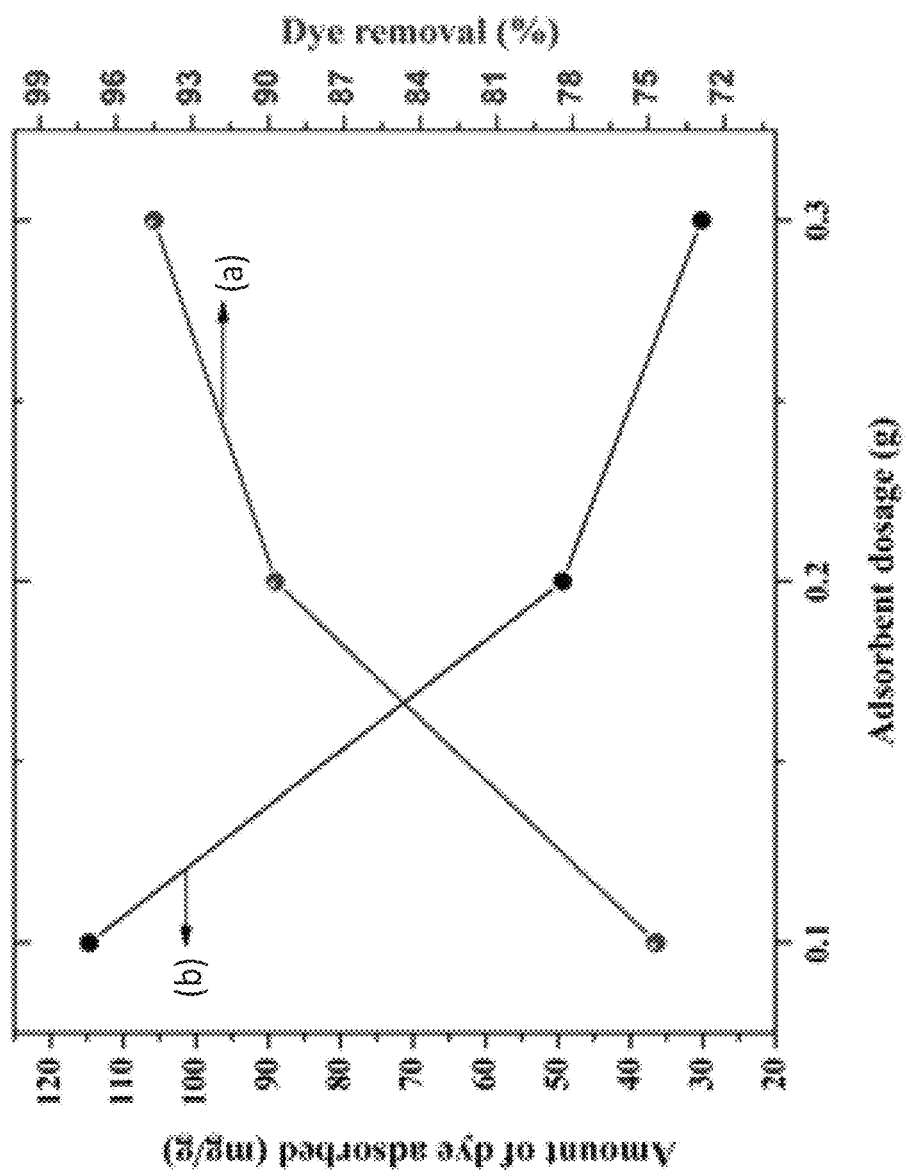
FIG. 18 is a graphical presentation of the effect of the adsorbent dosage on the MB removal efficiency of the adsorbent represented by line (a), and of the effect of the adsorbent dosage on the amount of MB adsorbed per unit mass of the adsorbent membrane represented by line (b), with the initial concentration of MB at 100 mg/L, according to Example 4.
Figure 19:
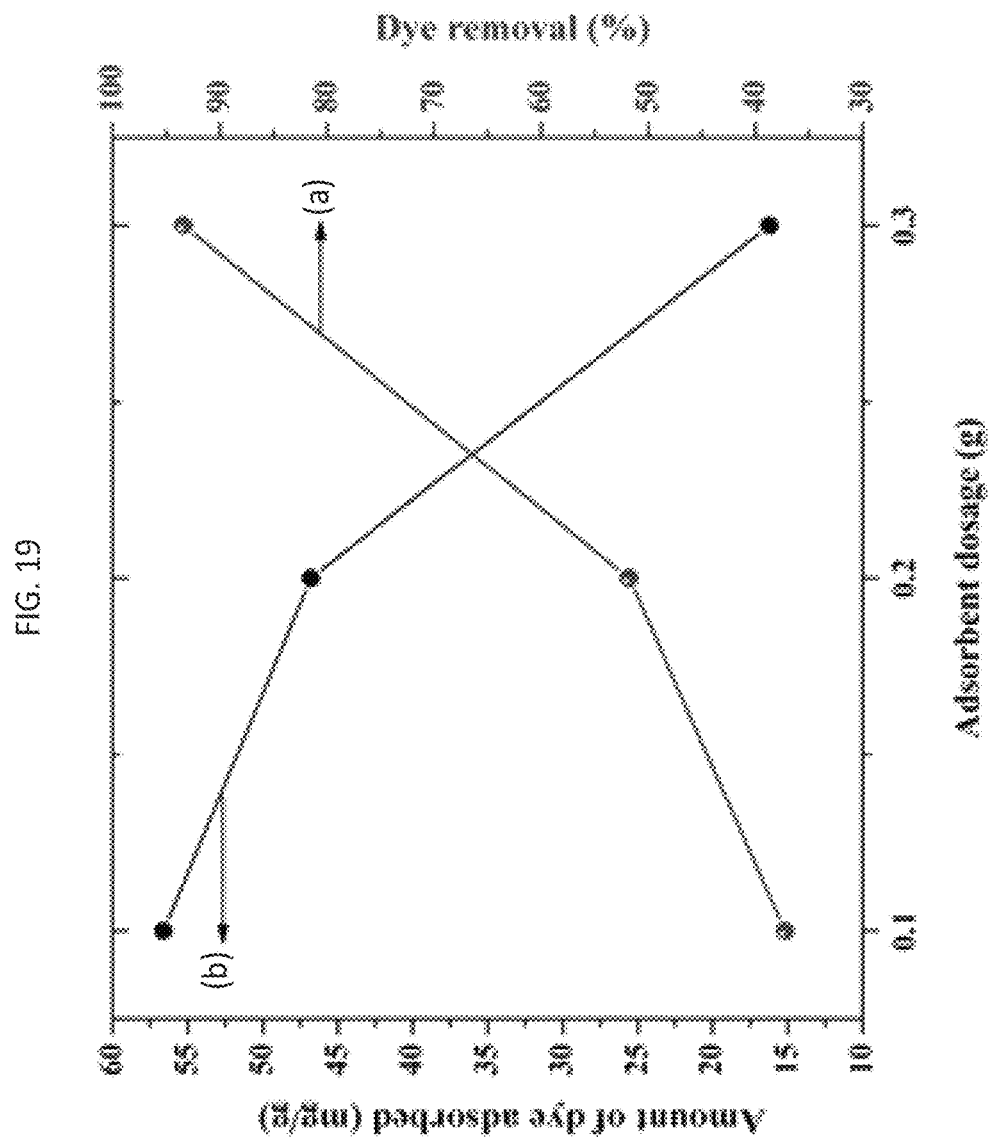
FIG. 19 is a graphical presentation of the effect of the adsorbent dosage on the RhB removal efficiency of the adsorbent represented by line (a), and of the effect of the adsorbent dosage on the amount of RhB adsorbed per unit mass of the adsorbent membrane represented by line (b), with the initial concentration of RhB at 100 mg/L, according to Example 4.

Referring to FIG. 16, line (a), FIG. 17, line (a), FIG. 18, line (a), and FIG. 19, line (a), the MB or RhB removal efficiency increased with an increase in the adsorbent dosage from 0.1 g to 0.3 g. As the dosage of the adsorbent was increased, a greater number of the adsorption sites were generated on the adsorbent membrane, enabling more dye molecules to be adsorbed, hence resulting in a higher removal efficiency. Additionally, at neutral pH (pH 7), the membrane was negatively charged due to the deprotonation of the carboxyl groups on the membrane. With the increase in the dosage, an electrostatic interaction between the negatively charged membrane and the cationic dye molecules was also increased. The combined effect of more adsorption sites and the stronger electrostatic interaction led to the highest MB and RhB removal efficiencies with 0.3 g of the adsorbent as compared to those with 0.1 g or 0.2 g of the adsorbent. However, with the increase in the adsorbent dosage, the amount of the dye adsorbed per unit mass of the adsorbent membrane was reduced from 58.03 to 15.02 mg/g for MB (which had an initial concentration of 50 mg/L) shown in FIG. 16, line (b), and from 49.96 to 15.36 mg/g for RhB (which had an initial concentration of 50 mg/L) shown in FIG. 17, line (b). As shown in FIG. 18, line (b) and FIG. 19, line (b), where both MB and RhB had an initial concentration of 100 mg/L, there was a similar trend of the reduced amount of MB and RhB adsorbed per unit mass of the adsorbent membrane with the increased adsorbent (membrane) dosage. A greater number of unsaturated sites at a higher adsorbent dose decreased the adsorbate density on the membrane, as reflected in the lower $q_e$ values, i.e. the amount of the dye adsorbed per unit mass of the adsorbent (membrane) at equilibrium (See V. Vadivelan, K. V. Kumar, Equilibrium, kinetics, mechanism, and process design for the sorption of methylene blue onto rice husk, J. Colloid Interface Sci., 286 (2005) 90-100, incorporated herein by reference in its entirety).

Example 5

Effect of pH on the Dye Adsorption/Removal Efficiency of the Adsorbent

Cationic dyes exist in cationic form in an aqueous solution. The pH of the solution influences the charge on the adsorbent membrane which in turns affects the degree of adsorption of the dyes on the membrane. The pH also influences the degree of ionization of the dye molecules. Since the membrane comprises HA/SA/HEC with carboxyl and phenolic groups, it will exhibit different behaviors in acidic and basic media. At a low pH, i.e at a pH less than $P_{zc}$, the cationic dye molecules are in competition with the hydrogen ions to interact with the adsorbent membrane. Moreover, the membrane may become positively charged because of the protonation of the carboxyl groups in addition to the H$^+$ ions it adsorbs, repelling the positively charged MB and RhB molecules it contacts. Owing to this combined effect, adsorption is low at a pH less than $P_{zc}$. In general, there is an increase in the dye adsorption efficiency with an increase in pH, because at a high pH the adsorption sites become deprotonated, making the membrane negatively charged and attract the positively charged dye.

Figure 20:
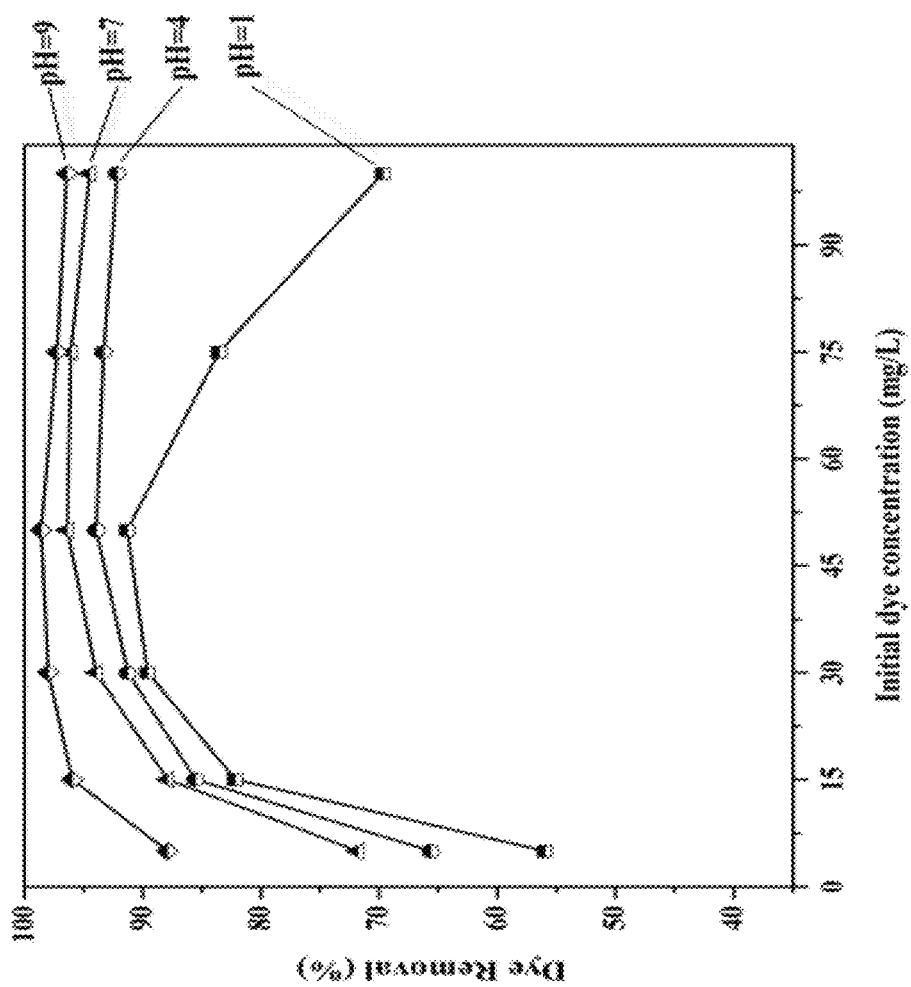
FIG. 20 is a graphical presentation of the effect of pH on the MB removal efficiency of the adsorbent according to Example 5.
Figure 21:
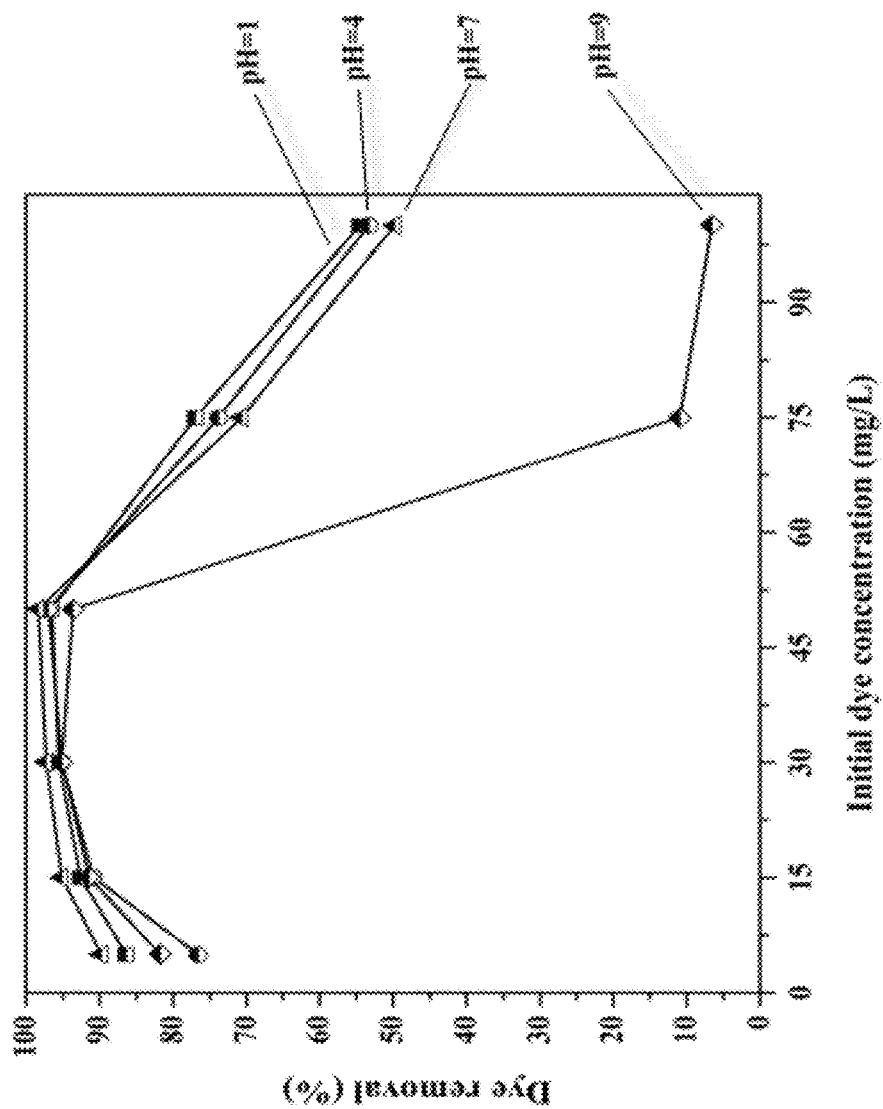
FIG. 21 is a graphical presentation of the effect of pH on the RhB removal efficiency of the adsorbent according to Example 5.

In both studies presented in FIG. 20 and FIG. 21, the amount of the adsorbent used was 0.3 g. Referring to FIG. 20, the adsorption efficiency of the adsorbent for MB was greater at pH 9 than that at pH 1, pH 4, or pH 7. Since the deprotonation of the carboxyl groups occurs at pH>4, and the deprotonation of the phenolic OH groups occurs at pH>8, both the carboxylic and the phenolic groups are completely deprotonated at pH 9, making the adsorbent membrane more negative at pH 9 than at pH 1, pH 4, or pH 7 (See C. Dong, W. Chen, C. Liu, Y. Liu, H. Liu, Synthesis of magnetic chitosan nanoparticle and its adsorption property for humic acid from aqueous solution, Colloids and Surfaces A: Physicochemical and Engineering Aspects, 446 (2014) 179-189, incorporated herein by reference in its entirety).

Figure 22:
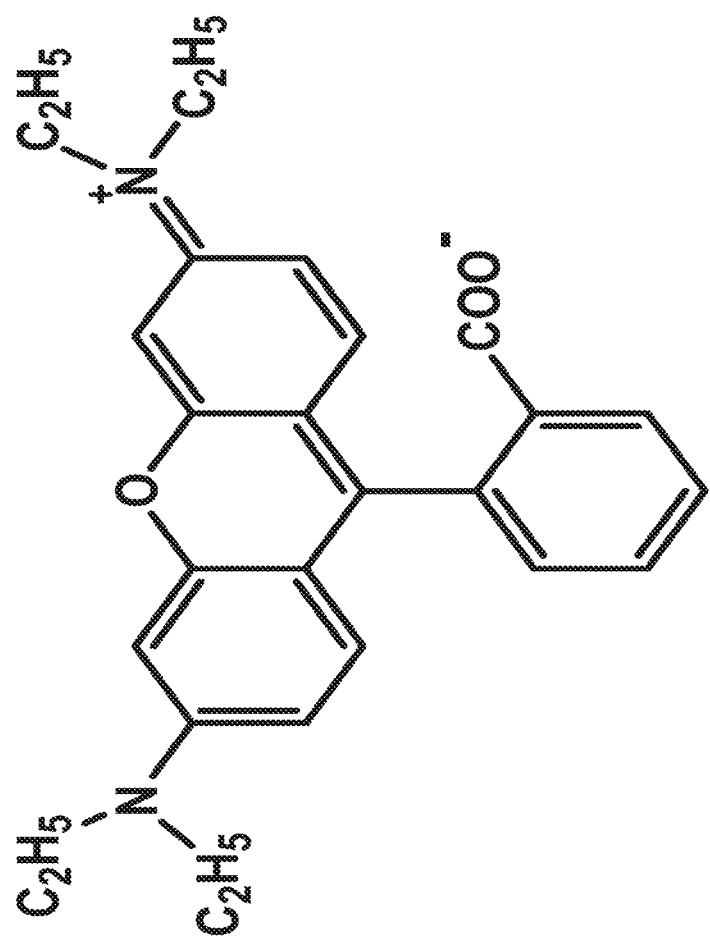
FIG. 22 is a graphical presentation of the Zwitterionic form of RhB according to Example 5.

Referring to FIG. 21, by contrast, the adsorption efficiency for RhB was the least at pH 9 compared to that at pH 1, pH 4, or pH 7. In an aqueous solution, RhB exists as a zwitterion at a pH of greater than 4 as shown in FIG. 22 (See L. Peng, P. Qin, M. Lei, Q. Zeng, H. Song, J. Yang, J. Shao, B. Liao, J. Gu, Modifying Fe3O4 nanoparticles with humic acid for removal of Rhodamine B in water, J. Hazard. Mater., 209-210 (2012) 193-198, incorporated herein by reference in its entirety). The zwitterionic form of RhB reduces the interaction between the negatively charged membrane and RhB, resulting in the decreased RhB adsorption efficiency at a high pH, particularly at pH 9.

Example 6

Figure 23:
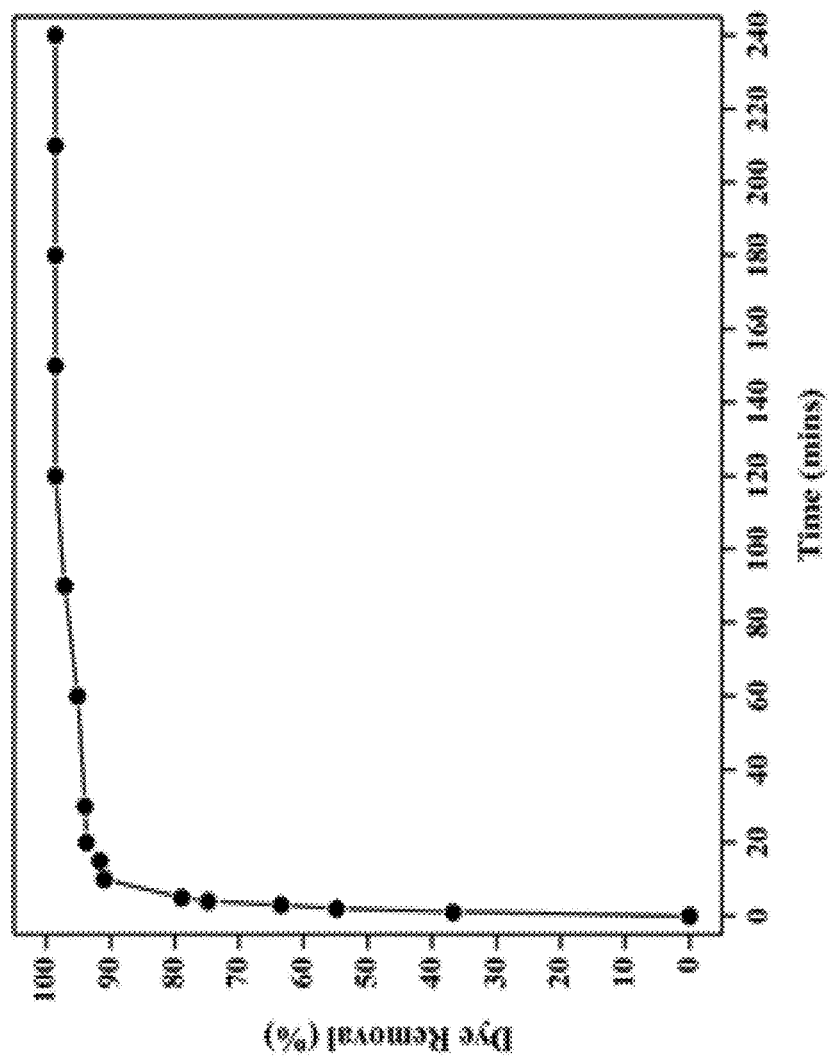
FIG. 23 is a graphical presentation of the MB removal efficiency of the adsorbent at various times of the adsorption process according to Example 6.
Figure 24:
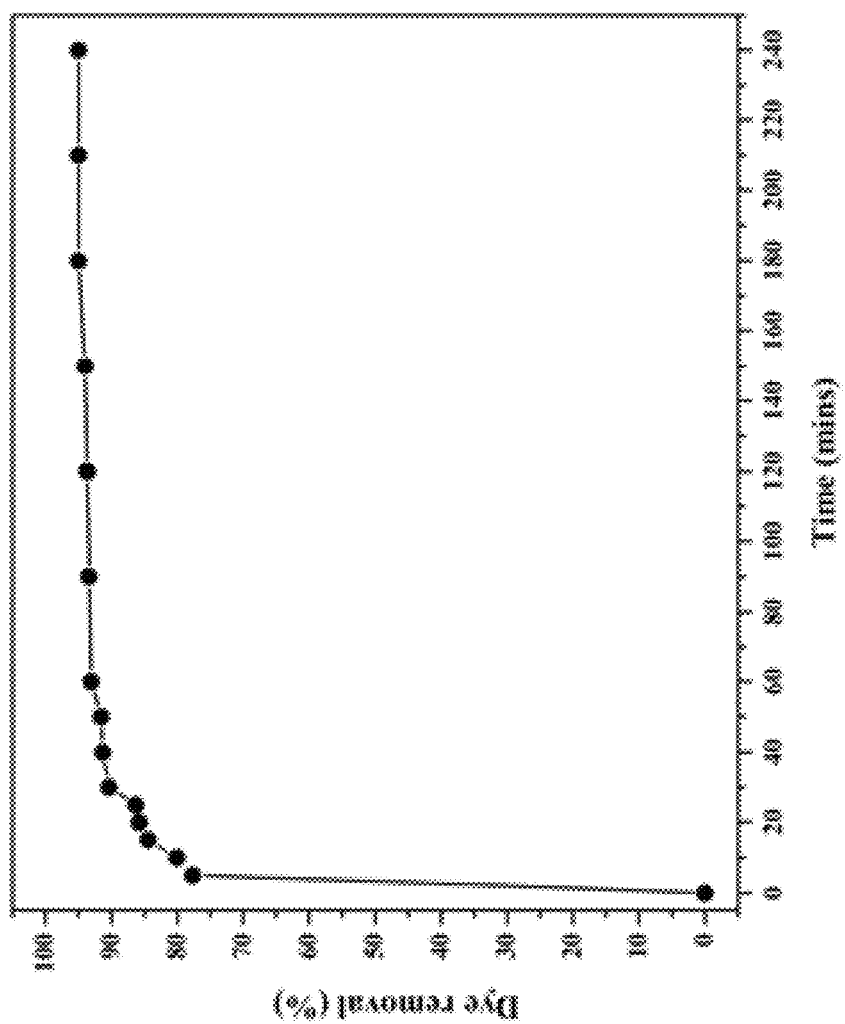
FIG. 24 is a graphical presentation of the RhB removal efficiency of the adsorbent at various times of the adsorption process according to Example 6.

Effect of Adsorption Time on the Dye Adsorption/Removal Efficiency of the Adsorbent Referring to FIGS. 23 and 24, the adsorbent adsorbed/removed most of the MB or RhB dye during the first 40 to 50 min of the adsorption process. More specifically, the adsorbent removed nearly 80% of the dye during the first 10 min of the adsorption process. Referring to FIG. 23, the adsorption was performed with the initial MB concentration of 50 mg/L and 0.3 g of the adsorbent and at pH 7. The adsorption equilibrium was achieved for MB by 120 min after the start of the adsorption process, with the adsorbent removing 96% of MB from the MB containing solution. Referring to FIG. 24, the adsorption was performed with the initial RhB concentration of 50 mg/L and 0.3 g of the adsorbent and at pH 7. The adsorption equilibrium was achieved for RhB by 180 min after the start of the adsorption process, with the adsorbent removing 94.9% of RhB from the RhB containing solution. The high dye removal efficiency seen at the initial stage of the adsorption process was a result of the presence of excess vacant sites on the membrane readily available for the dye molecules to occupy. As the adsorption progressed and the available adsorption sites on the membrane became fewer, it became difficult for the dye molecules to be adsorbed, as indicated by the slower removal of the dye from the solution. The adsorption equilibrium is reached when the amount of dye adsorbed onto the adsorbent is equal to the amount of dye desorbed from the adsorbent (See G. L. Dotto, L. A. A. Pinto, Adsorption of food dyes onto chitosan: Optimization process and kinetic, Carbohydr. Polym., 84 (2011) 231-238, incorporated herein by reference in its entirety).

Example 7

Determination of the Adsorption Isotherm for the Cationic Dye Adsorption by the Adsorbent Membrane Information regarding how the adsorbate molecules distribute themselves between the liquid and solid phase is generally provided by the adsorption isotherms (See T. S. Natarajan, H. C. Bajaj, R. J. Tayade, Preferential adsorption behavior of methylene blue dye onto surface hydroxyl group enriched TiO2 nanotube and its photocatalytic regeneration, J. Colloid Interface Sci., 433 (2014) 104-114, incorporated herein by reference in its entirety). The dye adsorption onto the adsorbent membrane was studied by fitting the adsorption data with four isotherm models, i.e. the Langmuir, Fruendlich, Temkin and Dubinin-Radushkevich equations.

1. Langmuir Isotherm

Langmuir isotherm is based on the assumption that all the adsorbent sites are equivalent and there is no interaction between the adsorbate molecules forming a monolayer on the adsorbent surface. The linear form of the Langmuir equation is shown in Equation (3)

$$\frac{C_e}{q_e} = \frac{1}{bq_{max}} + \frac{C_e}{q_{max}} \tag{3}$$

where $C_e$ (mg/L) and $q_e$ (mg/g) are the concentration and amount of dye adsorbed per unit mass of the adsorbent at equilibrium, respectively; b is the Langmuir coefficient (L/mg) related to the affinity of binding site; and $q_{max}$ is the maximum adsorption capacity per unit mass of the adsorbent (mg/g).

2. Freundlich Isotherm

The Freundlich isotherm is applied to a heterogeneous adsorbent surface based on the assumption that the adsorbent sites are not equivalent. Equation (4) is the linear form of the Freundlich equation:

$$\ln q_e = \ln K_F + \frac{1}{n} \ln C_e \tag{4}$$

where $C_e$ (mg/L) and $q_e$ (mg/g) are the concentration and amount of dye adsorbed per unit mass of the adsorbent at equilibrium, respectively; $K_F$ ($mg^{1-1/n}$ $L^{1/n}$ $g^{-1}$) and n are Freundlich coefficients related to adsorption capacity and adsorption intensity, respectively. If the reciprocal of the Freundlich coefficient (1/n) is less than 1, it is considered as an indication of favorable adsorption.

3. Temkin Isotherm

The Temkin model takes into consideration the effects of an interaction between adsorbates and gives an idea about the heat of the adsorption process. It has the equation $$q_e = B \ln A + B \ln C_e \tag{5}$$

where, $$B = \frac{RT}{b}$$

where R is the universal gas constant (8.314 J $mol^{-1}K^{-1}$); B and b (J $mol^{-1}$) are Temkin coefficients and A (L/mg) is the equilibrium binding constant corresponding to maximum binding energy.

4. Dubinin-Radushkevich Isotherm

The Dubinin-Radushkevich (D-R) isotherm helps in determining whether an adsorption process is of a physical, an ion exchange or a chemical adsorption type. It has the equation $$\ln q_e = \ln q_{max} - K_D \varepsilon^2 \tag{6}$$

where $K_D$ ($mol^2/J^2$) is the D-R constant which is related to adsorption energy; $\varepsilon$ is the Polanyi potential (J/mol) calculated with the following equation:

$$\varepsilon = RT \ln\left(1 + \frac{1}{C_e}\right)$$

where R is the gas constant (J $mol^{-1}$ $K^{-1}$) is the absolute temperature (K) and $C_e$ (mg/L) is the concentration of dye at equilibrium. The D-R constant is used to calculate mean free energy of adsorption E according to the following equation:

$$E = \frac{1}{\sqrt{2K_D}}$$

Depending on the value of E, the type of an adsorption process can be identified. If E is <8 kJ/mol, a physical adsorption may be dominant. If E lies between 8 kJ/mol and 16 kJ/mol, the adsorption process may be an ion exchange adsorption; when E is >16 kJ/mol, the adsorption process may be a chemical adsorption.

Referring to Table 1 showing the adsorption isotherm results of all the models, the adsorption data fitted the Dubinin-Radushkevich isotherm more satisfactorily than the other isotherms. The regression coefficients for the Langmuir, Freundlich and Temkin isotherms were lower than that for the D-R model. The mean free energy of adsorption (E) calculated from the D-R model was less than 8 kJ/mol for both of the dyes, indicating that the adsorbent membrane adsorbs the dye molecules through physical adsorption.

TABLE 1

Isotherm parameters for MB and RhB adsorption on the HA/SA/HEC membrane

| Dye | MB | RhB |
|---|---|---|
| Langmuir Isotherm | | |
| $q_{max}$ | 2.85 (mg/g) | 18.814 (mg/g) |
| b | 0.193 (L/mg) | 0.293 (L/mg) |
| $R^2$ | 0.623 | 0.96 |

TABLE 1-continued

Isotherm parameters for MB and RhB adsorption on the HA/SA/HEC membrane

| Dye | MB | RhB |
|---|---|---|
| Freundlich Isotherm | | |
| 1/n | 0.95 | 0.485 |
| $K_F$ | 1.404 | 4.11 |
| $R^2$ | 0.517 | 0.55 |
| Temkin Isotherm | | |
| B | 7.62 | 3.744 |
| A | 0.819 (L/mg) | 4.58 (L/mg) |
| $R^2$ | 0.827 | 0.787 |
| Dubinin-Radushkevich Isotherm | | |
| $K_D$ | $3.548 \times 10^{-6}$ (mol$^2$/J$^2$) | $6.02 \times 10^{-7}$ (mol$^2$/J$^2$) |
| E | 0.375 kJ/mol | 0.91 kJ/mol |
| $R^2$ | 0.954 | 0.967 |

Example 8

Determination of the Kinetic Model for the Cationic Dye Adsorption by the Adsorbent Membrane The rate of an adsorption process depends upon the nature and properties of the adsorbent and the experimental conditions. The progress of the dye adsorption was examined by fitting the experimental data using six different kinetic models, with the results presented in Table 2. A high regression coefficient value ($R^2$) (approaching unity) indicates the effectiveness of the model in describing the kinetics of the dye adsorption by the adsorbent membrane.

TABLE 2

Adsorption kinetic parameters for MB and RhB adsorption on the HA/SA/HEC membrane

| | Methylene blue | Rhodamine B |
|---|---|---|
| $q_{e,experimental}$ | 15.39 (mg/g) | 14.839 (mg/g) |
| Experimental parameters | $C_0$ = 50 mg/L, pH 7, T = 27° C. | |
| Pseudo-first order kinetic model | | |
| $q_{e,calculated}$ | 2.28 (mg/g) | 3.14 (mg/g) |
| $k_1$ | $3.3 \times 10^{-2}$ (min$^{-1}$) | $3.9 \times 10^{-2}$ (min$^{-1}$) |
| $R^2$ | 0.786 | 0.964 |
| Simple first order model | | |
| $k_1'$ | $-1.1 \times 10^{-2}$ (min$^{-1}$) | $-1.9 \times 10^{-3}$ (min$^{-1}$) |
| $R^2$ | 0.75 | 0.873 |
| Pseudo-second order kinetic model | | |
| $q_{e,calculated}$ | 15.625 (mg/g) | 14.97 (mg/g) |
| $k_2$ | $4.04 \times 10^{-2}$ (g/mg · min$^{-1}$) | $3.17 \times 10^{-2}$ (g/mg · min$^{-1}$) |
| $R^2$ | 0.9996 | 0.9997 |
| Ritchie's second order kinetic model | | |
| $k_2'$ | 0.489 (min$^{-1}$) | 0.555 (min$^{-1}$) |
| $R^2$ | 0.912 | 0.925 |
| Intraparticle diffusion model | | |
| $k_{id}$ | 0.1908 (mg/g · min$^{-0.5}$) | 0.3574 (mg/g · min$^{-0.5}$) |
| Intercept c | 13.46 | 11.88 |
| $R^2$ | 0.9587 | 0.9457 |
| Elovich Model | | |
| $R^2$ | 0.95 | 0.934 |
| β | 1.74 (g/mg) | 1.183 (g/mg) |
| α | $1.99 \times 10^9$ | $3.21 \times 10^5$ |

1. Pseudo-First Order Kinetic/Lagergren Model

Figure 26:
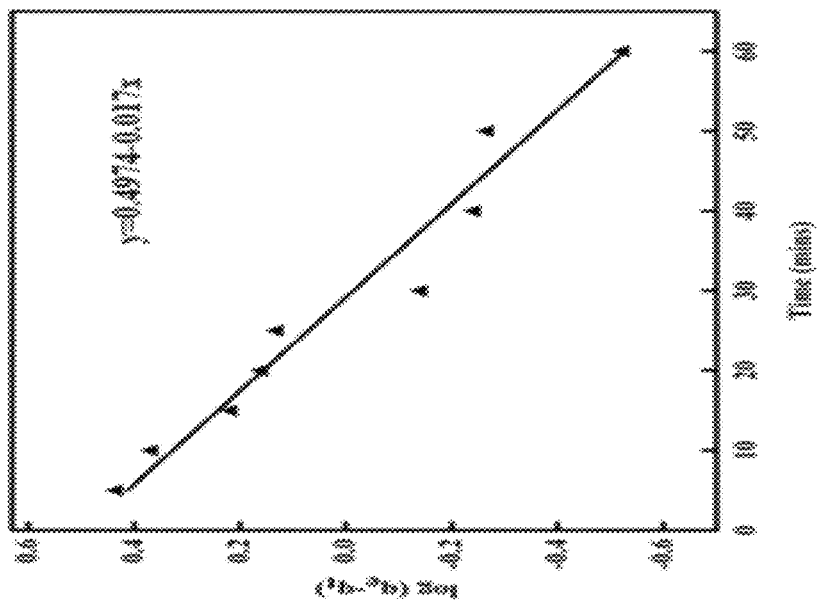
FIG. 26 is a graphical presentation of the pseudo-first order kinetic modeling of RhB adsorption by the adsorbent according to Example 8.
Figure 25:
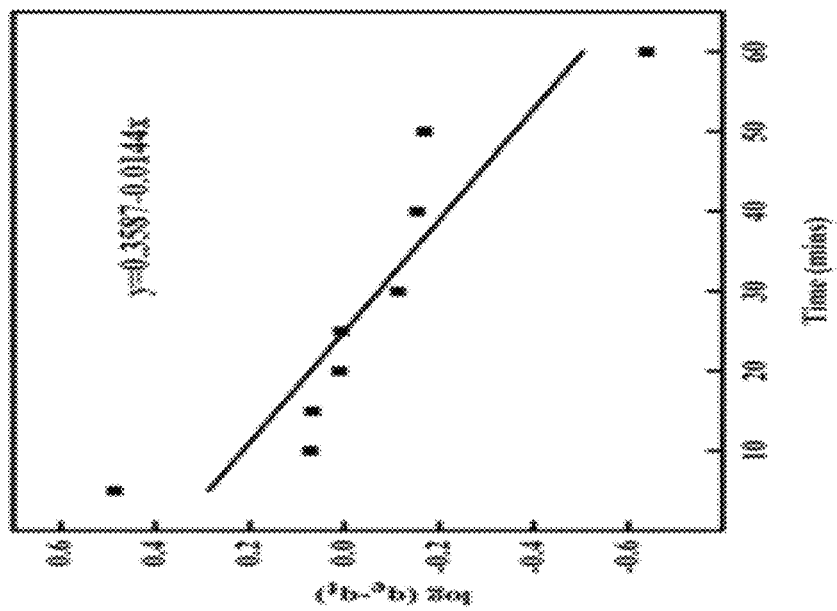
FIG. 25 is a graphical presentation of the pseudo-first order kinetic modeling of MB adsorption by the adsorbent according to Example 8.

Equation (7) is the pseudo-first order kinetic/Lagergren model equation, $$\log(q_e - q_t) = \log q_e - \frac{k_1 t}{2.303} \tag{7}$$

where $q_e$ is the amount of dye adsorbed per unit mass of the adsorbent at equilibrium (mg/g), $q_t$ is the amount of dye adsorbed per unit mass of the adsorbent at time t (mg/g), and $k_1$ is the first order rate constant (min$^{-1}$). The rate constant $k_1$ and $q_e$ values were determined from the slope and intercept of the linear graph of $\log(q_e-q_t)$ versus time t, respectively. Lagergren's first order kinetic equation is usually applicable for the initial 30 to 50 min of an adsorption process (See Y. Wang, Y. Mu, Q.-B. Zhao, H.-Q. Yu, Isotherms, kinetics and thermodynamics of dye biosorption by anaerobic sludge, Sep. Purif. Technol., 50 (2006) 1-7, incorporated herein by reference in its entirety). It is not suitable for the entire contact time of an adsorption process (See M. Otero, F. Rozada, L. F. Calvo, A. I. Garcia, A. Moran, Kinetic and equilibrium modelling of the methylene blue removal from solution by adsorbent materials produced from sewage sludges, Biochemical Engineering Journal, 15 (2003) 59-68, incorporated herein by reference in its entirety). Referring to FIGS. 25 and 26, and Table 2, fitting the experimental data with this model resulted in a considerable deviation of the experimental values from the theoretical values, with the $R^2$ value of 0.786 for MB adsorption and of 0.96 for RhB adsorption. Moreover, the calculated $q_e$ values for the MB and RhB adsorption did not agree well with the experimental $q_e$ values, indicating that the pseudo-first order model was not best suited to represent the dye adsorption process.

2. Simple First Order Kinetic Model

Figure 27:
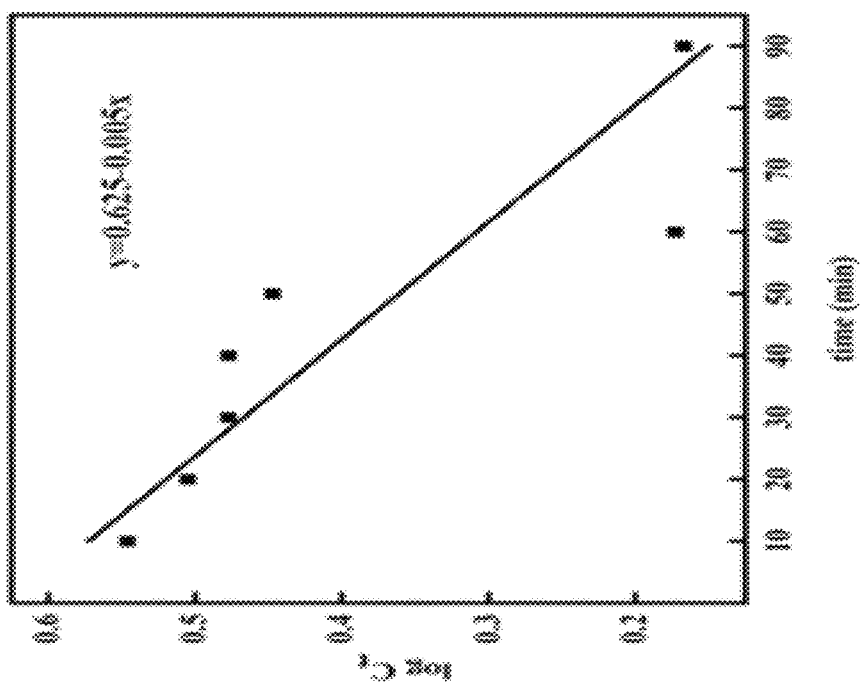
FIG. 27 is a graphical presentation of the simple first order kinetic modeling of MB adsorption by the adsorbent according to Example 8.
Figure 28:
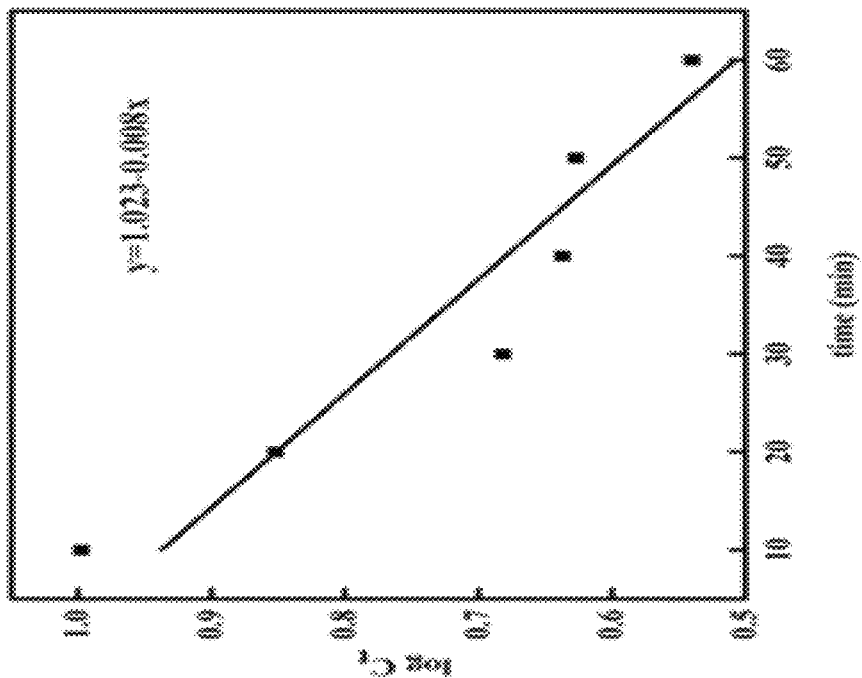
FIG. 28 is a graphical presentation of the simple first order kinetic modeling of RhB adsorption by the adsorbent according to Example 8.

Equation (8) is the simple first order kinetic model equation:

$$\log C_t = \frac{k_{1'}}{2.303} t + \log C_0 \tag{8}$$

where $C_t$ and $C_0$ are the dye concentrations at time t and time 0 (t=0). $k_{1'}$ is the rate constant (min$^{-1}$) obtained from slope of the linear graph of $\log C_t$ versus t. Since the concentration of dye decreased with time, the slope of the linear graph of $\log C_t$ versus t was negative, resulting in a negative rate constant value. Referring to FIGS. 27 and 28, and Table 2, the regression coefficient was the least with this model amongst all the models studied, suggesting that this model is not applicable to the adsorption data.

3. Pseudo-Second Order Kinetic Model

Figure 30:
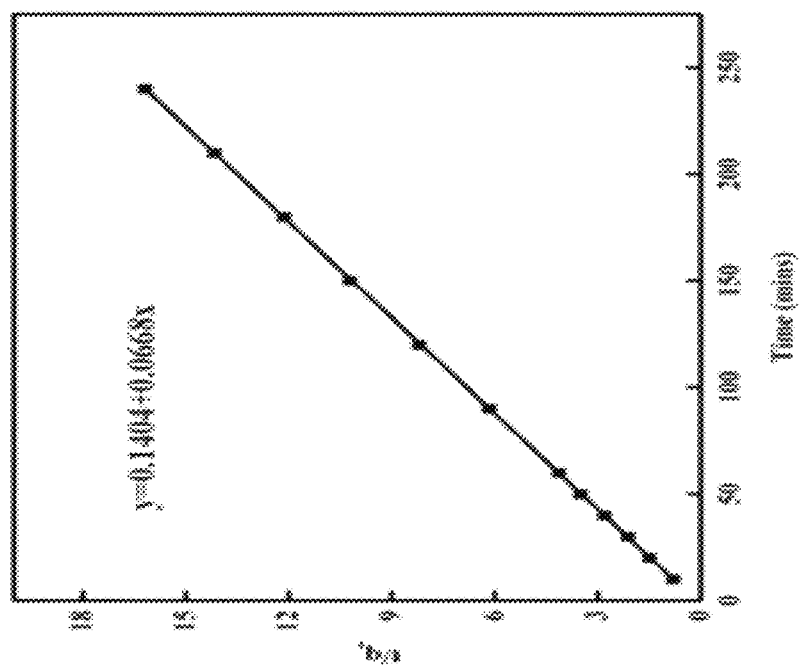
FIG. 30 is a graphical presentation of the pseudo-second order kinetic modeling of RhB adsorption by the adsorbent according to Example 8.
Figure 29:
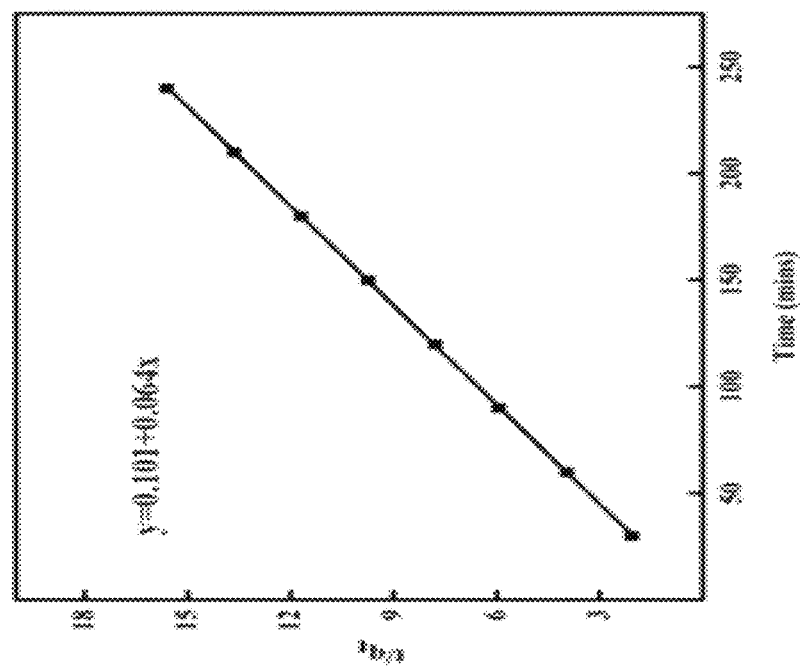
FIG. 29 is a graphical presentation of the pseudo-second order kinetic modeling of MB adsorption by the adsorbent according to Example 8.

Equation (9) is the pseudo-second order kinetic model equation:

$$\frac{t}{q_t} = \frac{1}{k_2 q_e^2} + \frac{t}{q_e} \tag{9}$$

where $q_e$ and $q_t$ in mg/g are the amount of dye adsorbed per unit mass of the adsorbent at equilibrium and at time t, respectively, $k_2$ is the second order rate constant (g/mg·min$^{-1}$) calculated from the intercept of the linear graph of $t/q_t$ versus time t. For most of the adsorbate-adsorbent systems, particularly when the adsorbate is a pollutant, the rate of the adsorption is best represented by the pseudo-second order kinetic model (See X. Zhang, P. Zhang, Z. Wu, L. Zhang, G. Zeng, C. Zhou, Adsorption of methylene blue onto humic acid-coated Fe3O4 nanoparticles, Colloids and Surfaces A: Physicochemical and Engineering Aspects, 435 (2013) 85-90, incorporated herein by reference in its entirety). The pseudo-second order kinetic model was developed by Ho to describe chemisorption involving covalent forces or ion exchange as valency forces between an adsorbent and an adsorbate (See Y. S. Ho, Review of second-order models for adsorption systems, J. Hazard. Mater., 136 (2006) 681-689, incorporated herein by reference in its entirety). The model allows determination of the adsorption capacity, the rate constant and the initial rate of adsorption without knowing any parameter in advance. Referring to Table 2 and FIGS. 29 and 30, the correlation coefficient ($R^2$) for the linear graph of ($t/q_t$) versus t was close to unity (>0.99) for both MB and RhB adsorption. Moreover, the calculated $q_e$ value was in good agreement with the experimentally determined $q_e$ value, suggesting that the second order kinetic model best explained the kinetics of the MB and RhB adsorption on the HA/SA/HEC membrane.

4. Ritchie's Second Order Kinetic Model

Figure 32:
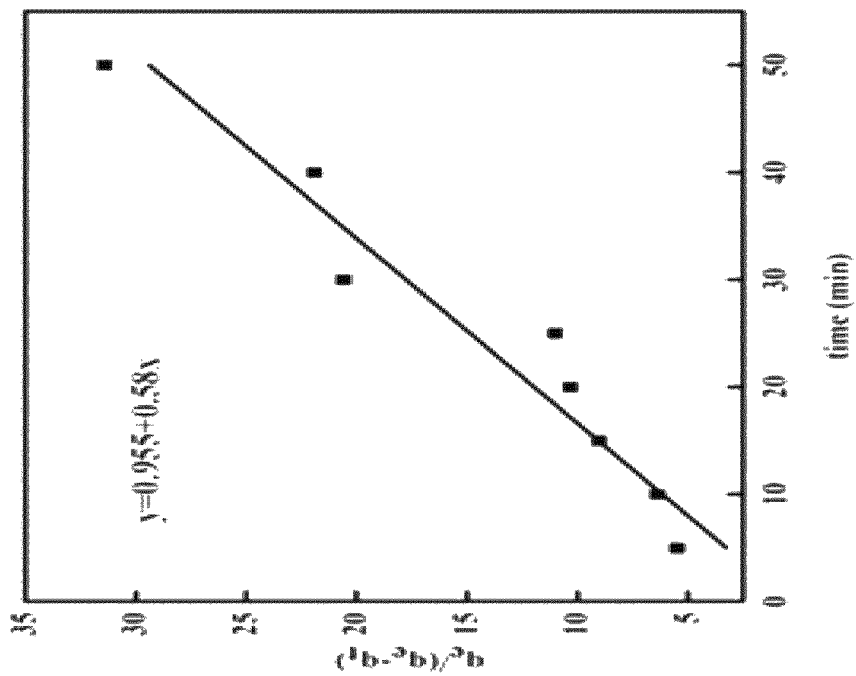
FIG. 32 is a graphical presentation of Ritchie's second order kinetic modeling of RhB adsorption by the adsorbent according to Example 8.
Figure 31:
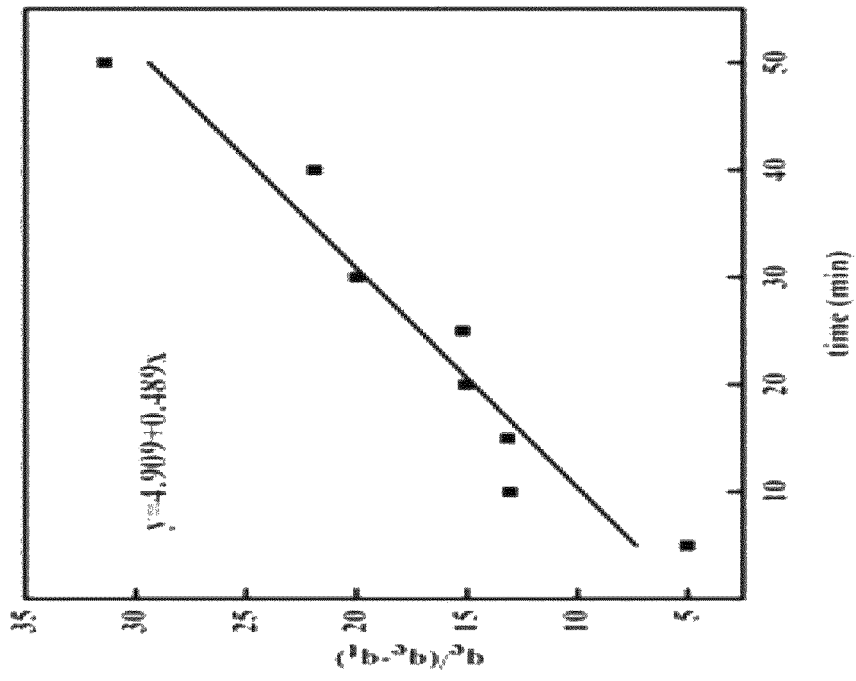
FIG. 31 is a graphical presentation of Ritchie's second order kinetic modeling of MB adsorption by the adsorbent according to Example 8.

Equation (10) is Ritchie's second order kinetic model equation:

$$\frac{q_e}{q_e - q_t} = 1 + k_{2'} t \tag{10}$$

where $k_{2'}$ is the rate constant (min$^{-1}$) and can be obtained by plotting $q_e/(q_e-q_t)$ versus t. Ritchie proposed this model as an alternative to Elovich model on the assumption that adsorption rate depends solely on the fraction of unoccupied sites at any time t (See A. G. Ritchie, Alternative to the Elovich equation for the kinetics of adsorption of gases on solids, Journal of the Chemical Society, Faraday Transactions 1: Physical Chemistry in Condensed Phases, 73 (1977) 1650-1653, incorporated herein by reference in its entirety). Referring to Table 2 and FIGS. 31 and 32, this model was not suitable to represent the kinetics of the adsorption of MB or RhB by the adsorbent based on the $R^2$ values and a considerable deviation of the experimental data from the calculated data.

5. Intraparticle Diffusion Model

Whether the adsorption of the dye molecules onto the membrane involves an intraparticle diffusion process was studied using the Webber and Moris plot according to Equation (11)

$$q_t = k_{id} t^{0.5} + c \tag{11}$$

where $k_{id}$ is the intraparticle diffusion rate constant (mg·g$^{-1}$ min$^{-0.5}$) obtained from the slope of the linear graph of $q_t$ versus $t^{0.5}$ (See N. Nasuha, B. H. Hameed, A. T. Din, Rejected tea as a potential low-cost adsorbent for the removal of methylene blue, J. Hazard. Mater., 175 (2010) 126-132, incorporated herein by reference in its entirety). The rate controlling step in the adsorption process may be one or more of the following steps (i) boundary layer diffusion which is due to external surface adsorption of dye molecules, (ii) intraparticle diffusion underlying the gradual adsorption process and (iii) final equilibrium stage (See W. H. Cheung, Y. S. Szeto, G. McKay, Intraparticle diffusion processes during acid dye adsorption onto chitosan, Bioresour. Technol., 98 (2007) 2897-2904, incorporated herein by reference in its entirety). Referring to FIGS. 33 and 34, it is evident that the dye adsorption onto the membrane occurred in three steps as mentioned above. The first part of the graph showed a steep increase in $q_t$ value indicating a fast diffusion of the dye molecules from the bulk of the solution to the external boundary of the adsorbent. The second part of the graph was the rate limiting step involving diffusion from the boundary layer to the interior or the active sites of the adsorbent. The final plateau region was due to a very slow adsorption rate at equilibrium. It is known that if the plot $q_t$ versus $t^{0.5}$ passes through the origin, then only the intraparticle diffusion is the rate limiting process. However in the current investigation, the presence of the intercept, which is directly proportional to the boundary layer thickness, indicates the presence of the boundary effect (See M. Dogan, M. Alkan, A. Turkyilmaz, Y. Ozdemir, Kinetics and mechanism of removal of methylene blue by adsorption onto perlite, J. Hazard. Mater., 109 (2004) 141-148, incorporated herein by reference in its entirety). Thus for MB and RhB adsorption onto the membrane, intraparticle diffusion and surface adsorption are the rate-limiting steps.

6. Elovich Model

In recent years, the Elovich model is used to describe the kinetics of adsorption of pollutants from aqueous solutions. Elovich model is applied to heterogeneous adsorbing systems involving chemisorption with the assumption that the adsorption rate decreases with time due to an increased coverage of the adsorbent surface with the adsorbates (See G. Zhao, J. Li, X. Wang, Kinetic and thermodynamic study of 1-naphthol adsorption from aqueous solution to sulfonated graphene nanosheets, Chem. Eng. J. (Lausanne), 173 (2011) 185-190, incorporated herein by reference in its entirety). Equation (12) is the simplified Elovich equation with the boundary conditions to be applied:

$$q_t = \frac{1}{\beta}\ln(\alpha\beta) + \frac{1}{\beta}\ln(t) \quad (12)$$

where $q_t$ is the amount of dye adsorbed at time t, $\alpha$ is the initial rate of adsorption (mg/g·min), and $\beta$ (g/mg) is the desorption constant related to the activation energy of chemisorption and indicates the number of sites available for adsorption (See R. Jayakumar, M. Rajasimman, C. Karthikeyan, Sorption of hexavalent chromium from aqueous solution using marine green algae Halimeda gracilis: Optimization, equilibrium, kinetic, thermodynamic and desorption studies, Journal of Environmental Chemical Engineering, 2 (2014) 1261-1274, incorporated herein by reference in its entirety).

Figure 36:
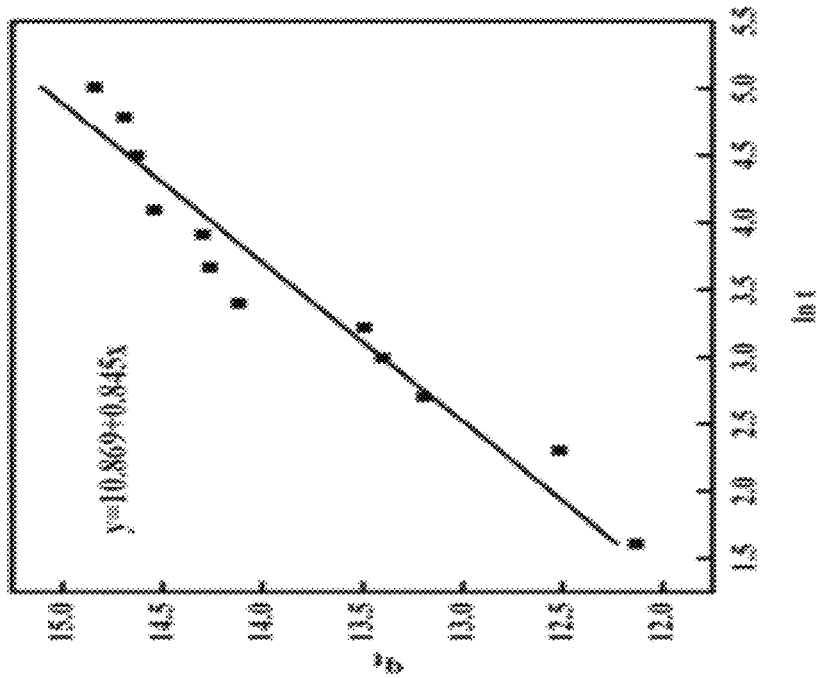
FIG. 36 is a graphical presentation of the Elovich kinetic modeling of RhB adsorption by the adsorbent according to Example 8.
Figure 35:
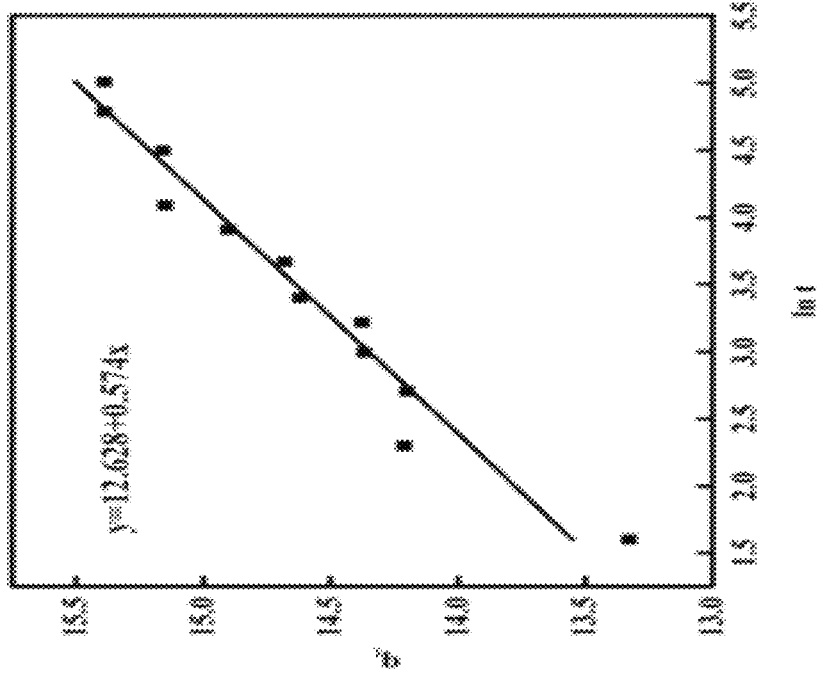
FIG. 35 is a graphical presentation of the Elovich kinetic modeling of MB adsorption by the adsorbent according to Example 8.

Referring to FIGS. 35 and 36 and Table 2, the fitting of the experimental data with the Elovich model was satisfactory with the regression coefficients of 0.95 and 0.934 for MB and RhB adsorption, respectively. The initial rate of adsorption (a) was much higher for MB adsorption than for RhB adsorption.

Amongst all the kinetic models, the pseudo-second order kinetic model best characterized the dynamics of the MB and RhB adsorption by the adsorbent membrane.

Example 9

Figure 37:
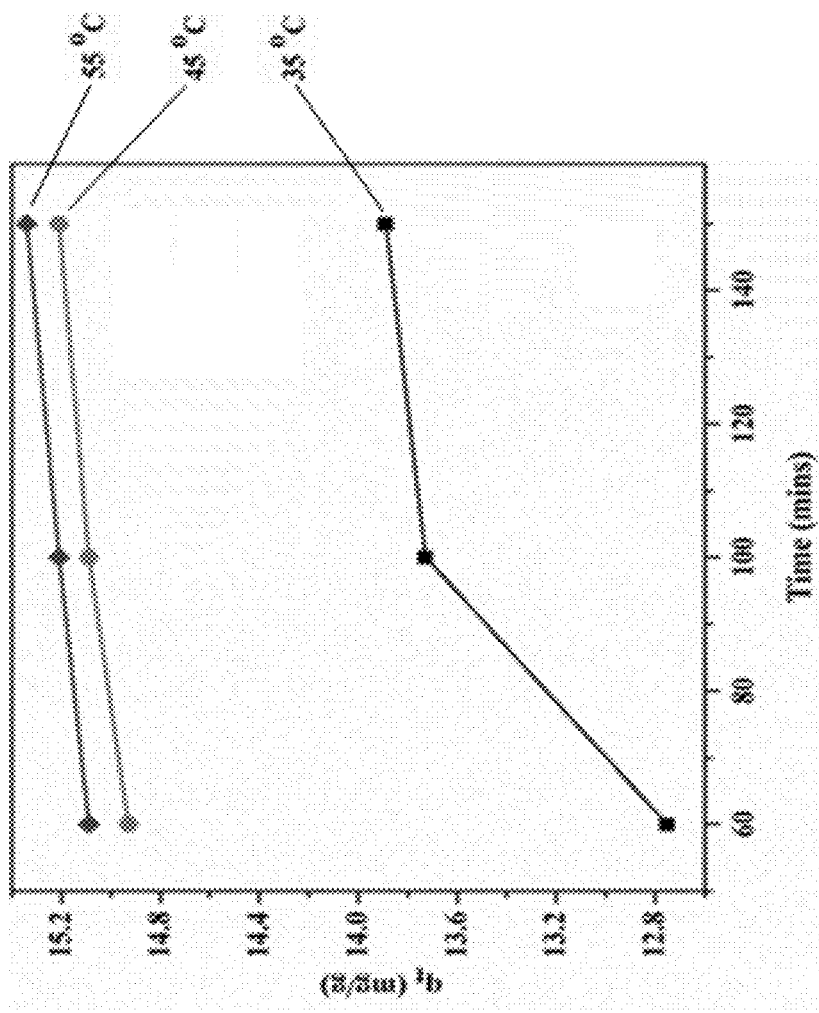
FIG. 37 is a graphical presentation of the effect of temperature on the amount of MB adsorbed per unit mass of the adsorbent membrane at various times of the adsorption process according to Example 9.
Figure 38:
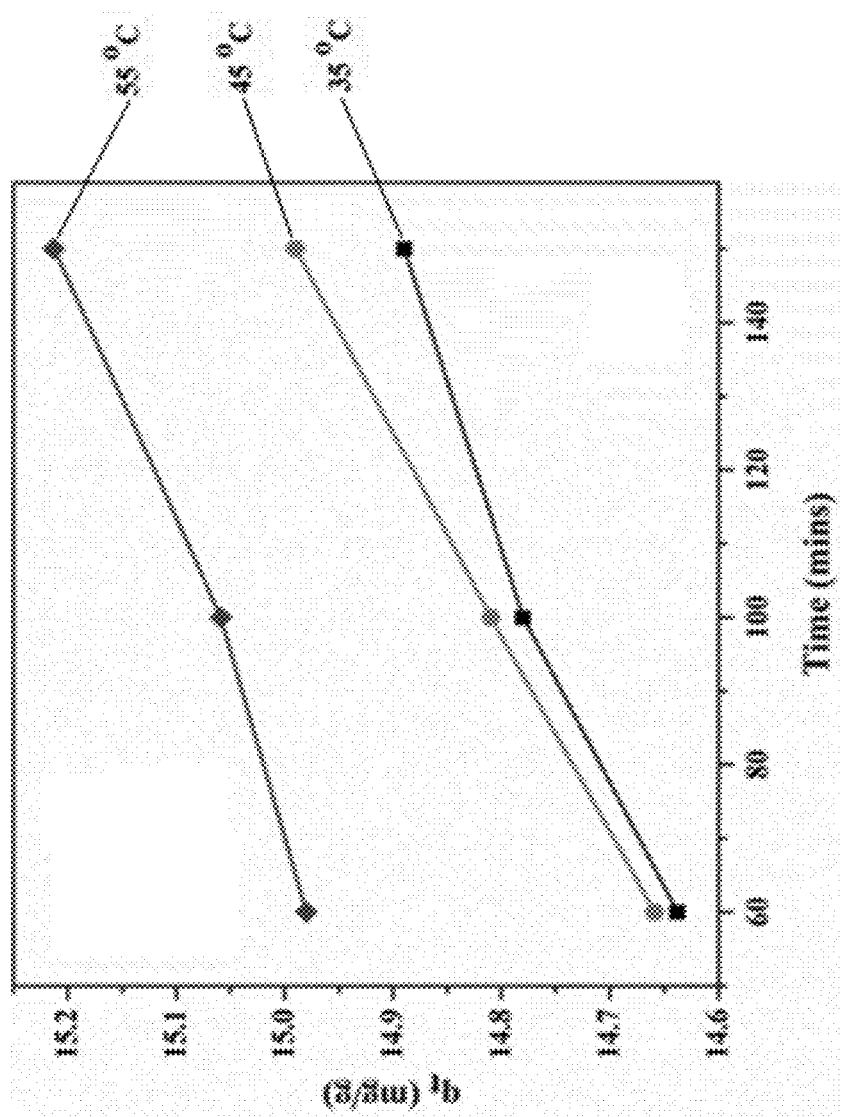
FIG. 38 is a graphical presentation of the effect of temperature on the amount of RhB adsorbed per unit mass of the adsorbent membrane at various times of the adsorption process according to Example 9.

Effect of Temperature on the Amount of MB and RhB Adsorbed Per Unit Mass of the Adsorbent Membrane Referring to FIGS. 37 and 38, the amount of MB or RhB adsorbed per unit mass of the adsorbent membrane at any time point during the adsorption process increased with the increasing temperature from 35° C. to 55° C., indicating that the adsorption process was endothermic in nature. The heat energy may assist the dye molecules in overcoming the activation barrier to attach themselves to the adsorbent membrane. The intraparticle diffusion rate of the dye to the membrane pores may also increase with the increase in temperature.

Example 10

Regeneration and Reusability of the Adsorbent Membrane

Figure 39:
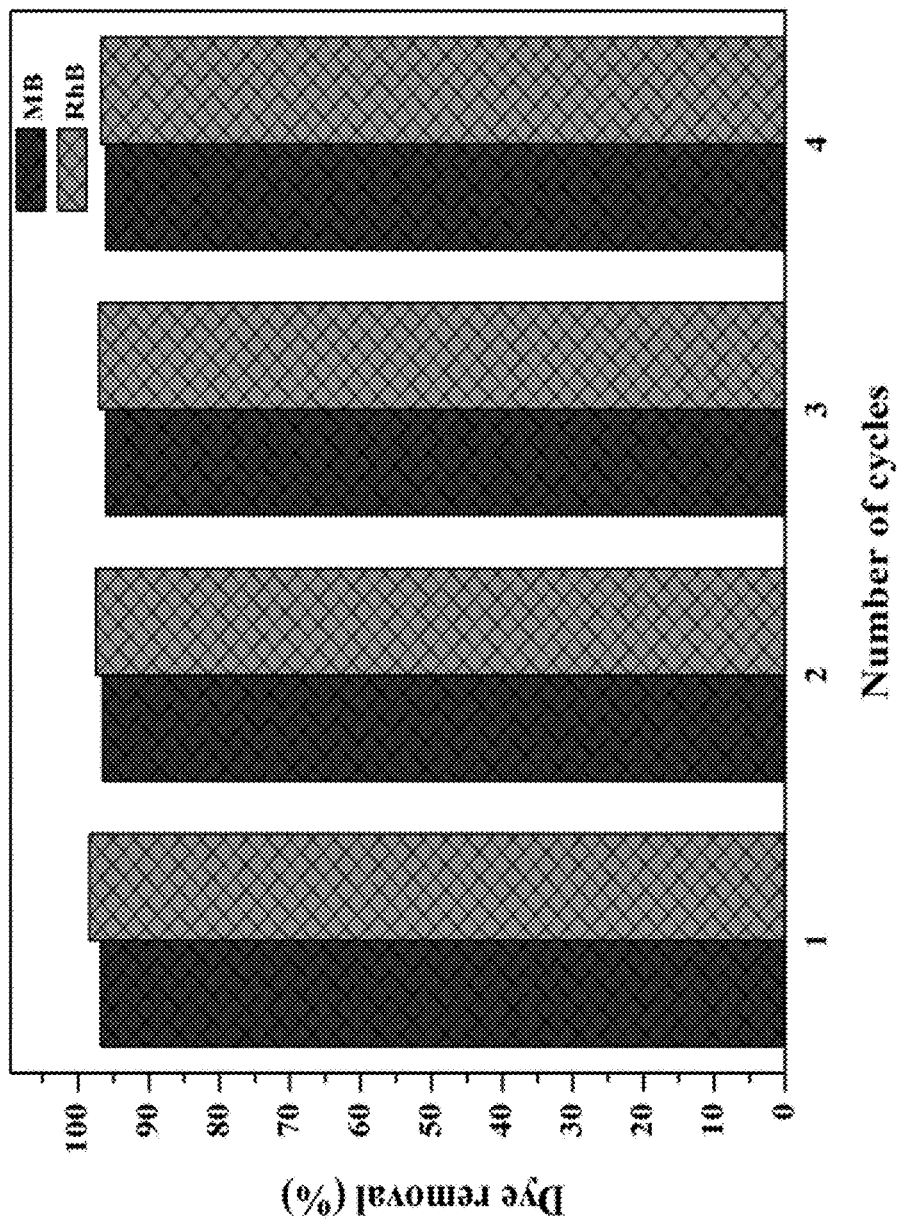
FIG. 39 is a graphical presentation showing the MB and RhB removal efficiencies of the adsorbent following one, two, three, and four cycles of adsorption and desorption with 0.1M HCl according to Example 10.

An adsorption process using an adsorbent that can be regenerated and reused is more environmentally friendly and economically viable. Regeneration and reusability of the prepared adsorbent membrane for the dye adsorption was investigated by subjecting the adsorbent to four cycles of adsorption and desorption. The adsorption was performed by contacting the adsorbent with a dye solution containing 50 mg/L of MB or RhB at pH 7. The desorption was performed by treating the dye-adsorbed adsorbent with a 0.1 M HCl solution. Referring to FIG. 39, there was no significant reduction in the dye removal efficiency of the adsorbent after one, two, three, or four cycles of adsorption and desorption, with the removal efficiency being maintained at nearly 98% for both MB and RhB after each successive cycle.

The invention claimed is:

1. A method of removing at least one cationic dye from an aqueous solution, comprising:
    contacting the aqueous solution with an adsorbent comprising a water-insoluble membrane disposed on a substrate,
    wherein the water-insoluble membrane consists essentially of glutaraldehyde cross-linked humic acid, at least one alginate, and hydroxyethyl cellulose,
    wherein the weight ratio of humic acid:at least one alginate:hydroxyethyl cellulose lies in the range (10-20):(60-80):(10-20) respectively; and
    wherein the contacting forms a treated aqueous solution having a lower concentration of the at least one cationic dye relative to the aqueous solution.

2. The method of claim 1, wherein the weight ratio of humic acid:at least one alginate:hydroxyethyl cellulose lies in the range (12-15):(70-76):(12-15).

3. The method of claim 1, wherein the at least one alginate comprises an unmodified alginate, a modified alginate, or a combination thereof.

4. The method of claim 1, wherein the humic acid, the at least one alginate, and the hydroxyethyl cellulose are further cross-linked by at least one cross-linking agent selected from the group consisting of aldehydes, oxidoreductase enzymes, and a combination thereof.

5. The method of claim 1, wherein at least one of the cross-linked humic acid, at least one alginate, and hydroxyethyl cellulose comprises or is modified to comprise a first molecular moiety, and the substrate comprises or is modified to comprise a second molecular moiety, and wherein the disposition of the water-insoluble membrane on the substrate comprises binding of the first molecular moiety to the second molecular moiety.

6. The method of claim 1, wherein the pH of the aqueous solution ranges from about 3 to about 10.

7. The method of claim 1, wherein the substrate comprises at least one material selected from the group consisting of polypropylene, polystyrene, PET (polyethylene terephthalate), polyimide, PEN (polyethylene naphthalate), agarose, acetate cellulose, PC (polycarbonate), glass, plastic, rubber, a metal, an alloy, a ceramic, a carbonaceous material, a polymer, sand, silicon, and silica.

8. The method of claim 1, wherein the at least one cationic dye is selected from the group consisting of methylene blue, rhodamine B, crystal violet, basic fuchsin, safranin, pararosaniline, and a combination thereof.

9. The method of claim 1, wherein the at least one cationic dye is methylene blue, and wherein said method removes at least 90% of the methylene blue from the aqueous solution.

10. The method of claim 1, wherein the at least one cationic dye is rhodamine B, and wherein said method removes at least 90% of the rhodamine B from the aqueous solution.

11. The method of claim 1, wherein the at least one cationic dye is rhodamine B, and wherein the concentration of the rhodamine B in the aqueous solution is below 75 mg/L.

12. The method of claim 1, further comprising regenerating the adsorbent by removing adsorbed cationic dye.

13. The method of claim 12, wherein regenerating the adsorbent comprises treating the adsorbent with at least one acid for a period of time effective to desorb the at least one cationic dye from the adsorbent.

14. The method of claim 1, wherein the concentration of the water-insoluble membrane of the adsorbent contacting the aqueous solution ranges from 0.04 g/100 ml to 0.64 g/100 ml of the aqueous solution.

15. The method of claim 1, wherein the adsorbent is disposed in a fixed bed reactor or fluidized bed reactor and the contacting involves passing the aqueous solution through the fixed bed reactor or fluidized bed reactor.

16. The method of claim 15, wherein the adsorbent is disposed in a fixed bed reactor that comprises a cartridge.

17. The method of claim 16, wherein the cartridge further comprises activated carbon.

18. The method of claim 1, wherein the adsorbent has a form selected from the group consisting of a granule, a pellet, a sphere, a powder, a woven fabric, a non-woven fabric, a mat, a felt, a block, and a honeycomb.

19. The method of claim 1, wherein the aqueous solution is contacted with the adsorbent at a temperature of about 10-90° C. and a pressure of about 1-50 bar.

20. The method of claim 1, further comprising removing the adsorbent from the treated aqueous solution.

21. The method of claim 1, wherein the adsorbent has been regenerated two, three or four times without significant reduction in dye removal efficiency, wherein removal efficiency is maintained at about 98% after each successive cycle or adsorption and desorption.

* * * * *